Sept. 1, 1931. J. T. SCHAAFF 1,821,078
PUNCH AND TYPEWRITER CONTROLLING MEANS THEREFOR
Filed Aug. 14, 1924 16 Sheets-Sheet 1
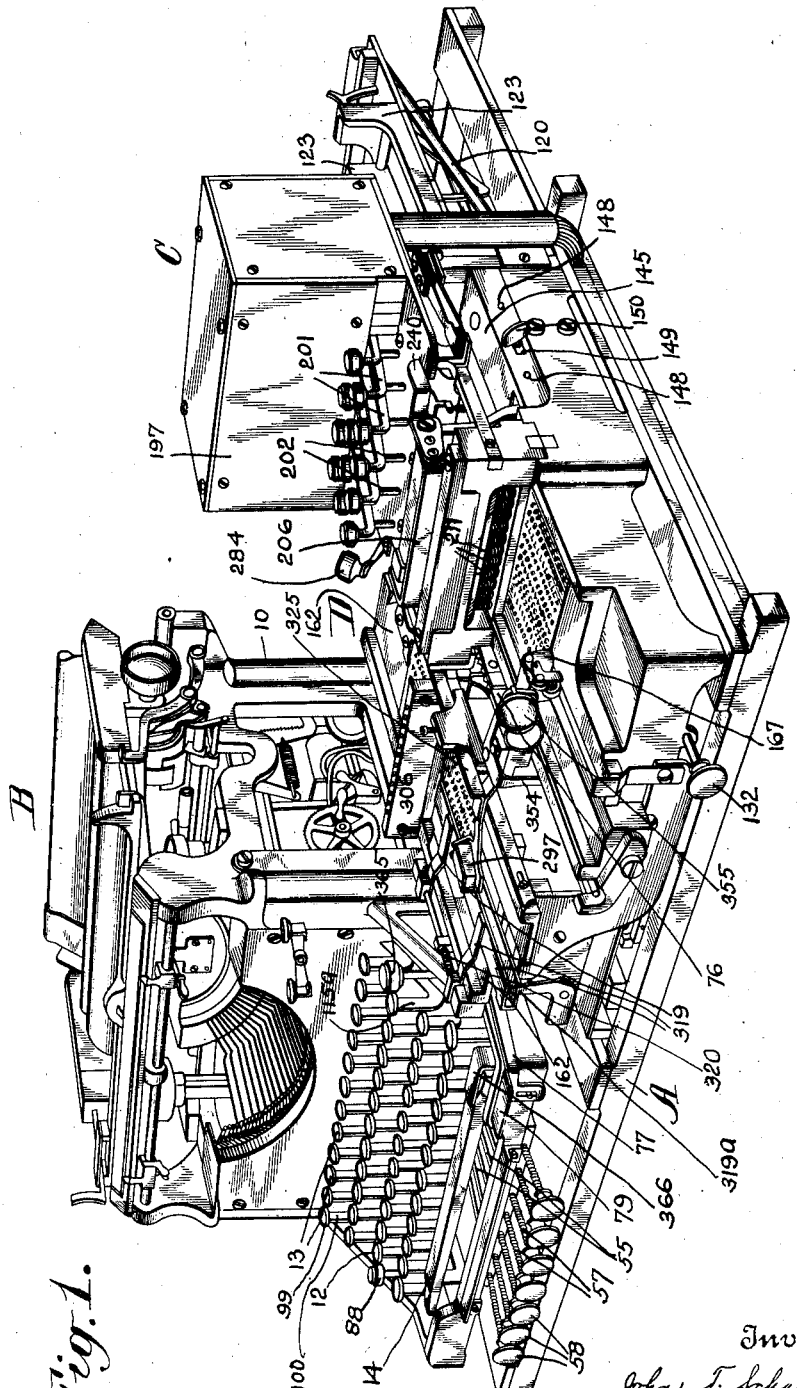
Fig.1.
Inventor
John T. Schaaff
By his Attorneys

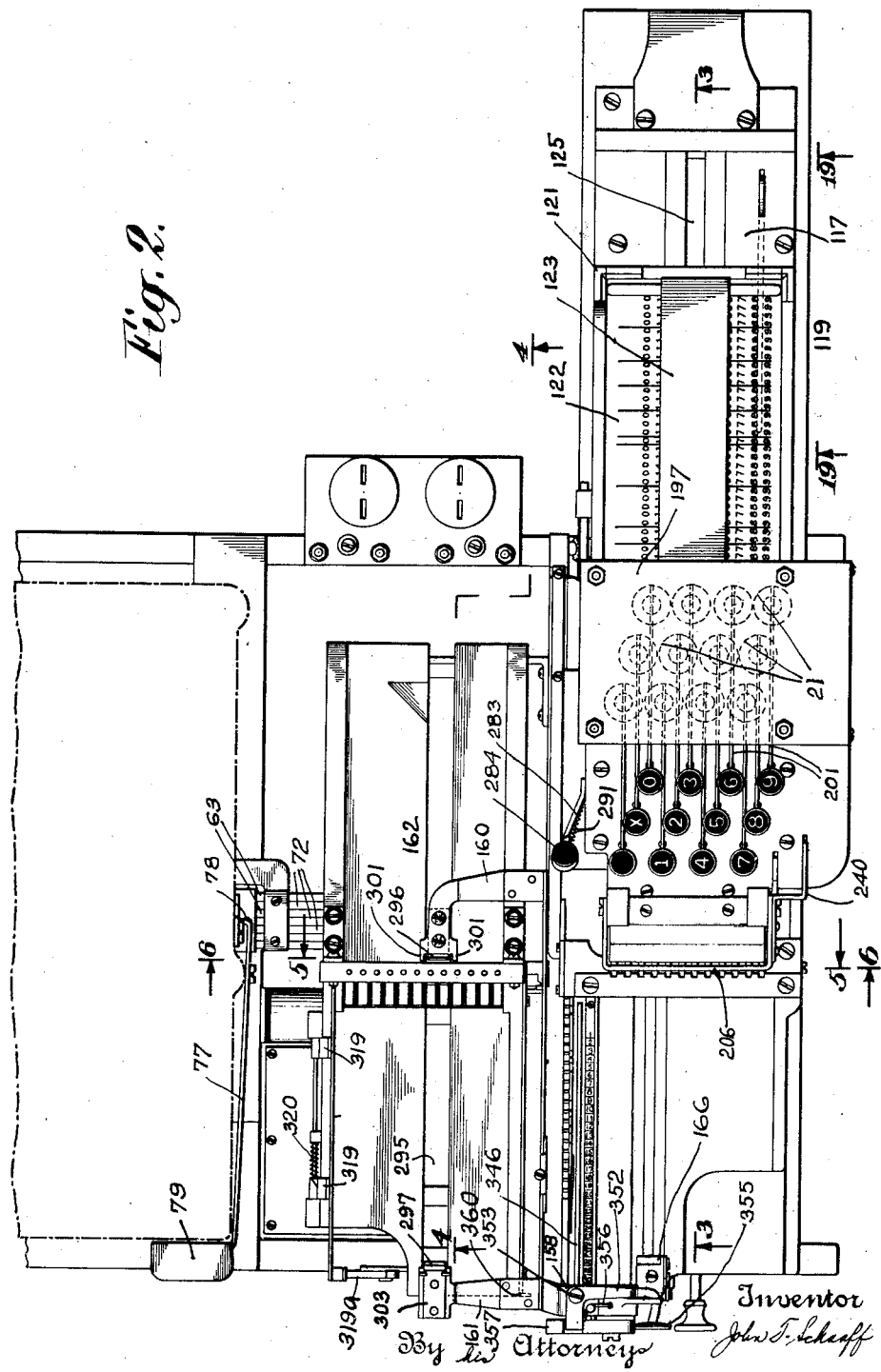

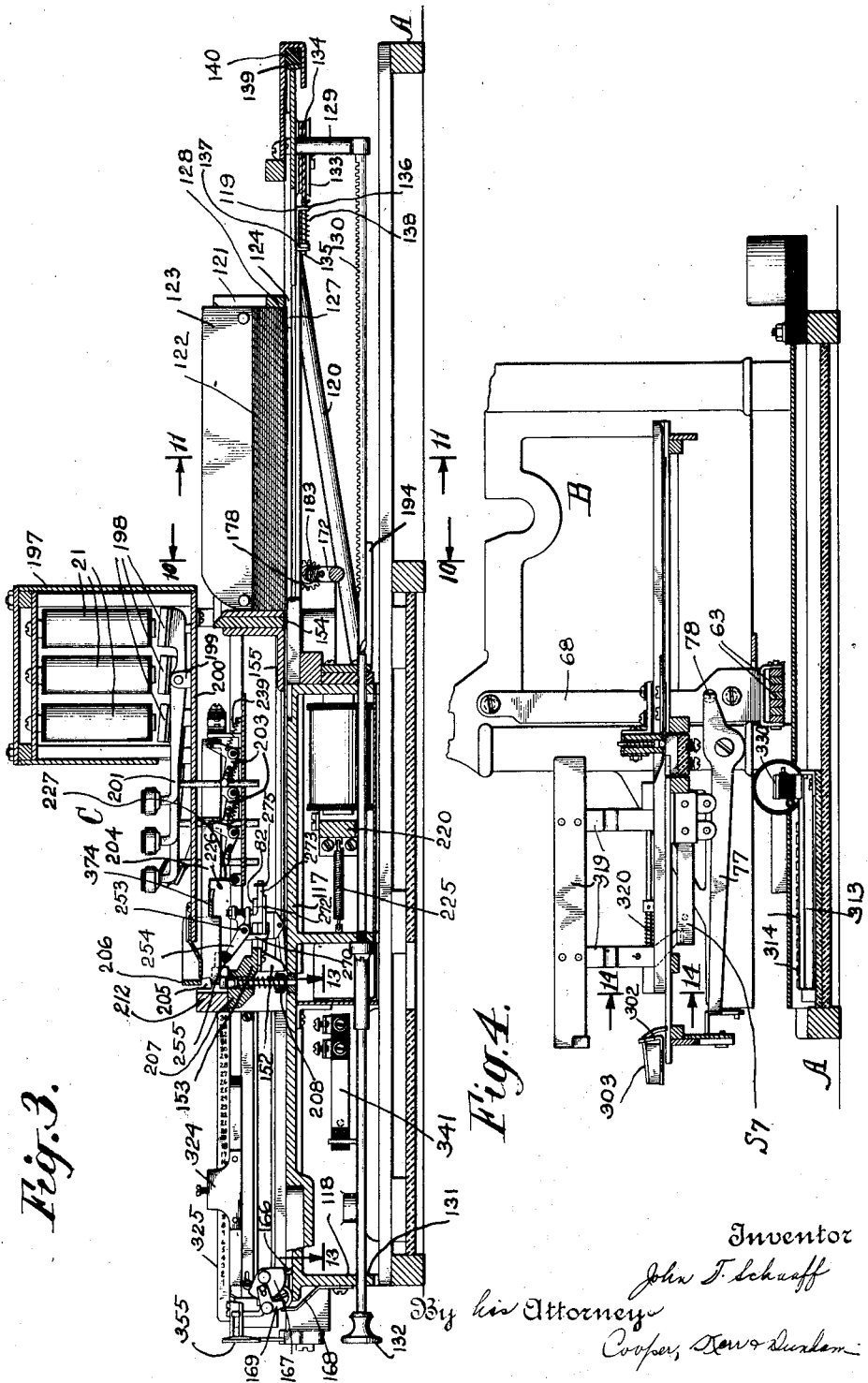

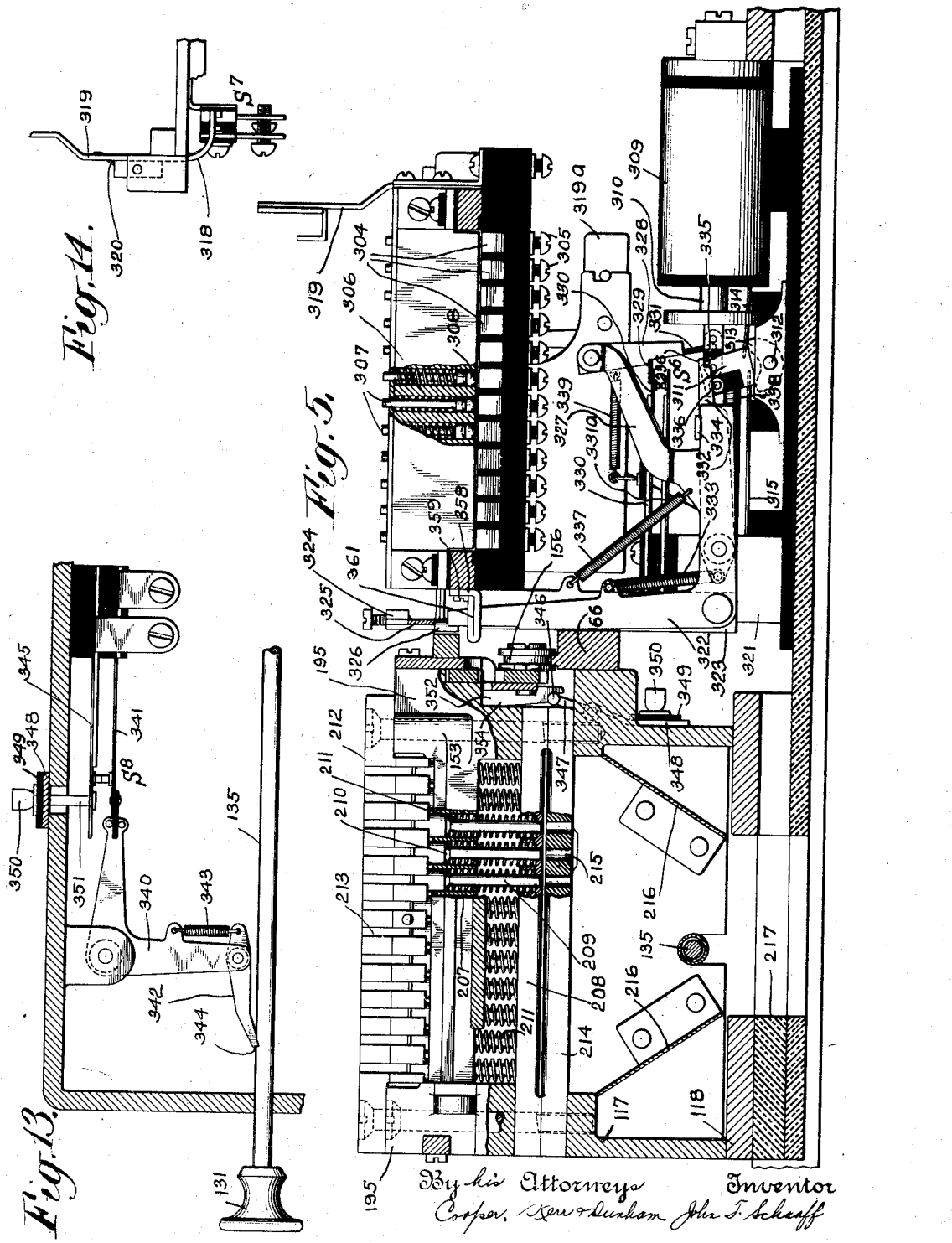

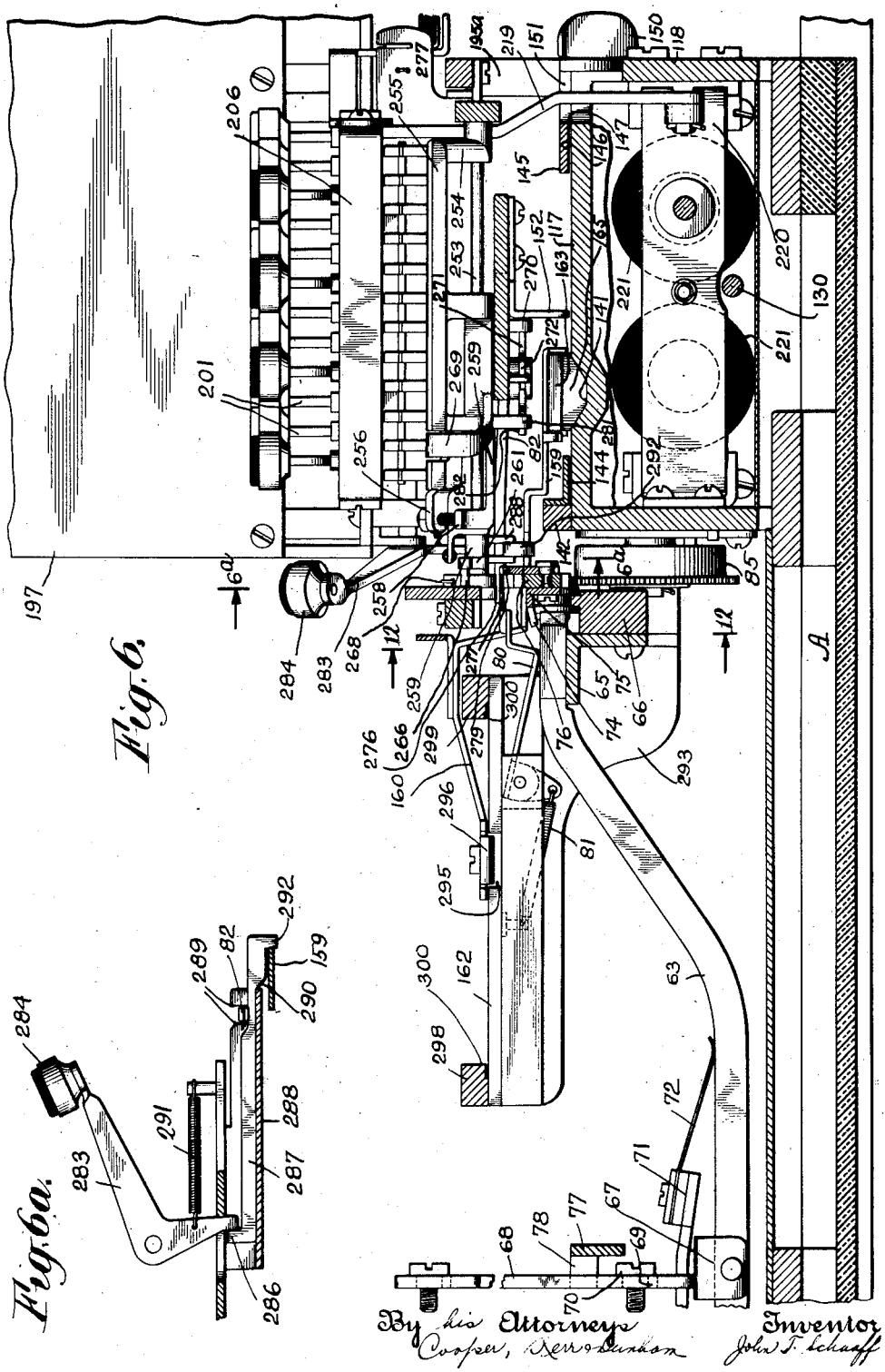

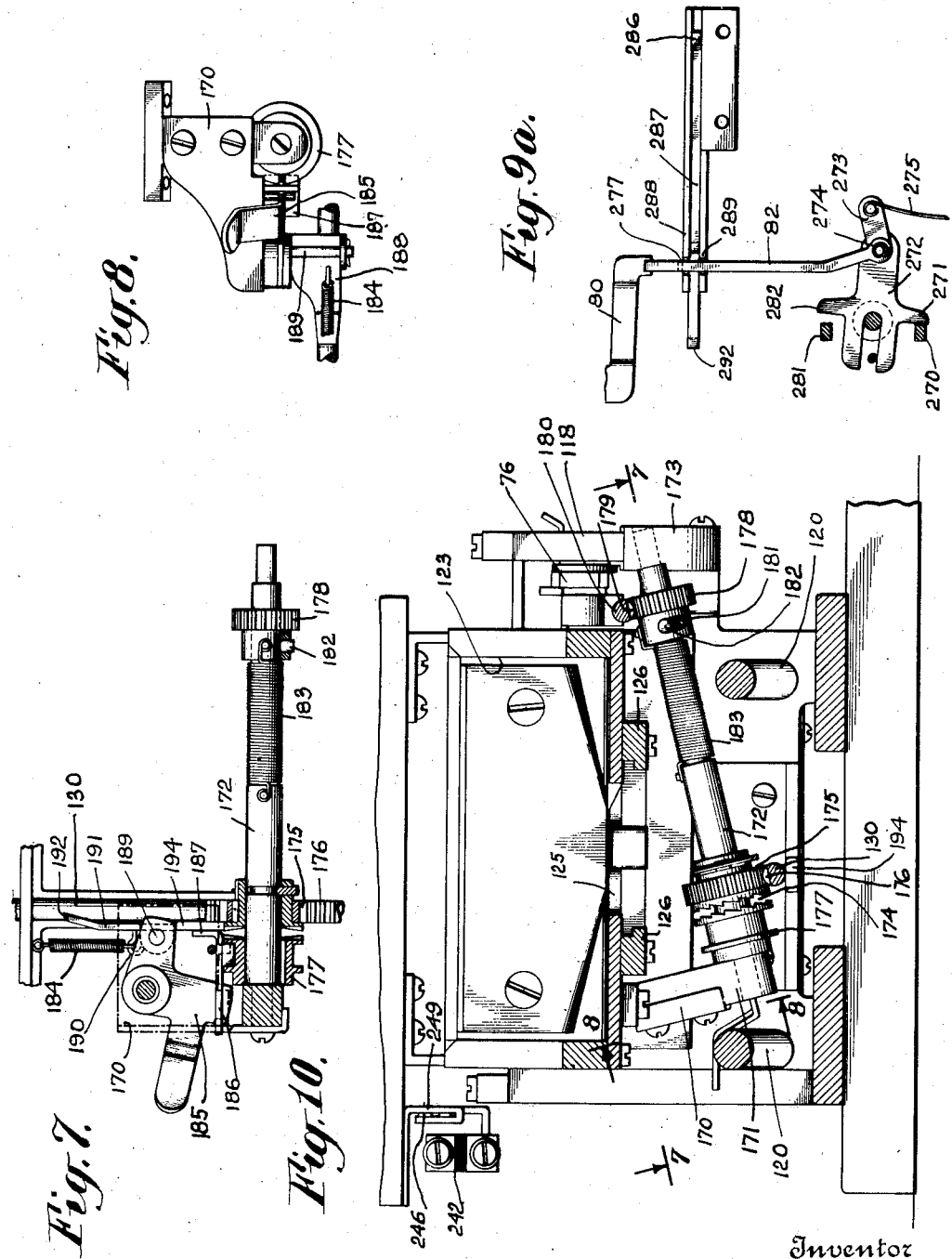

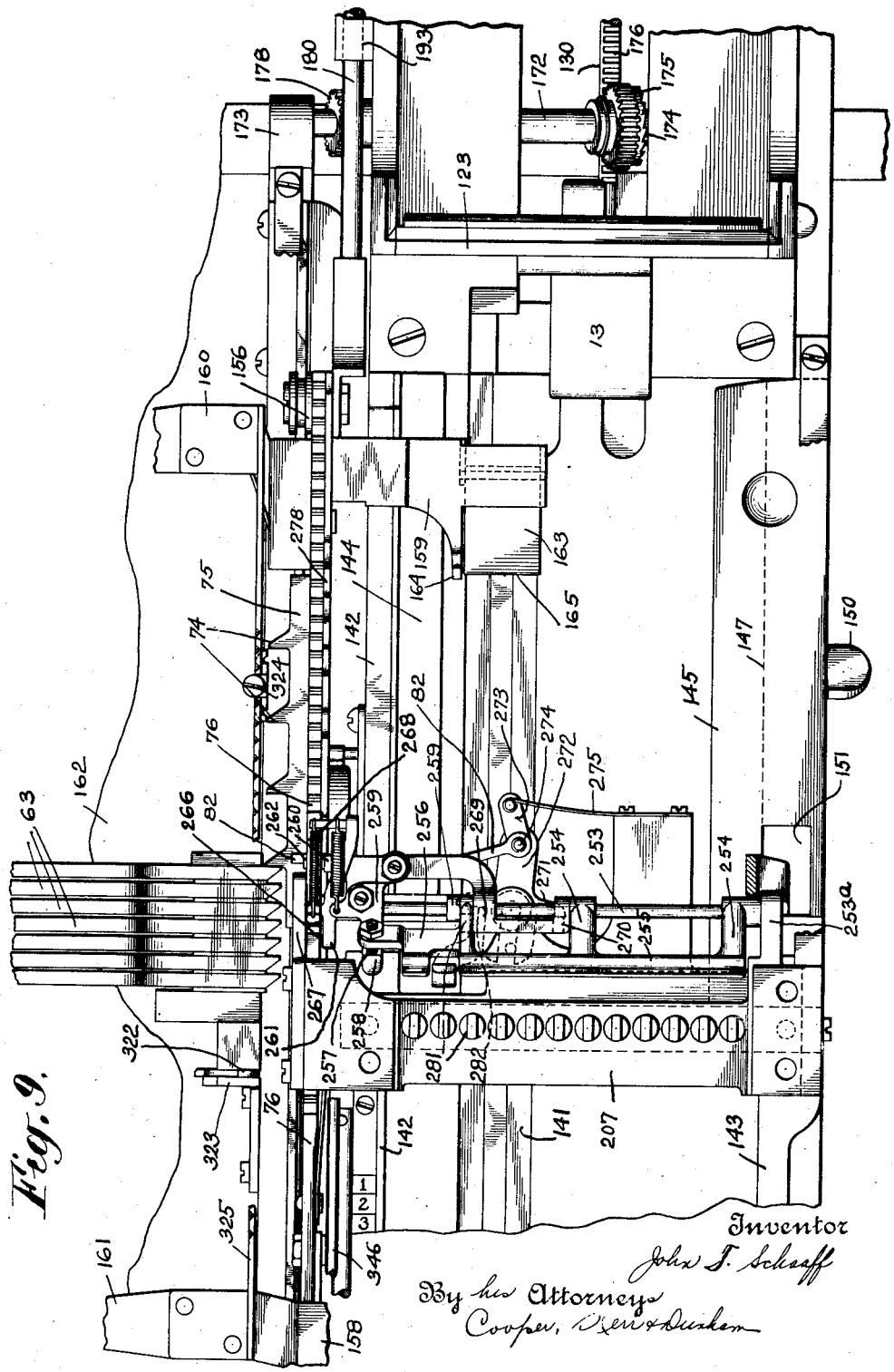

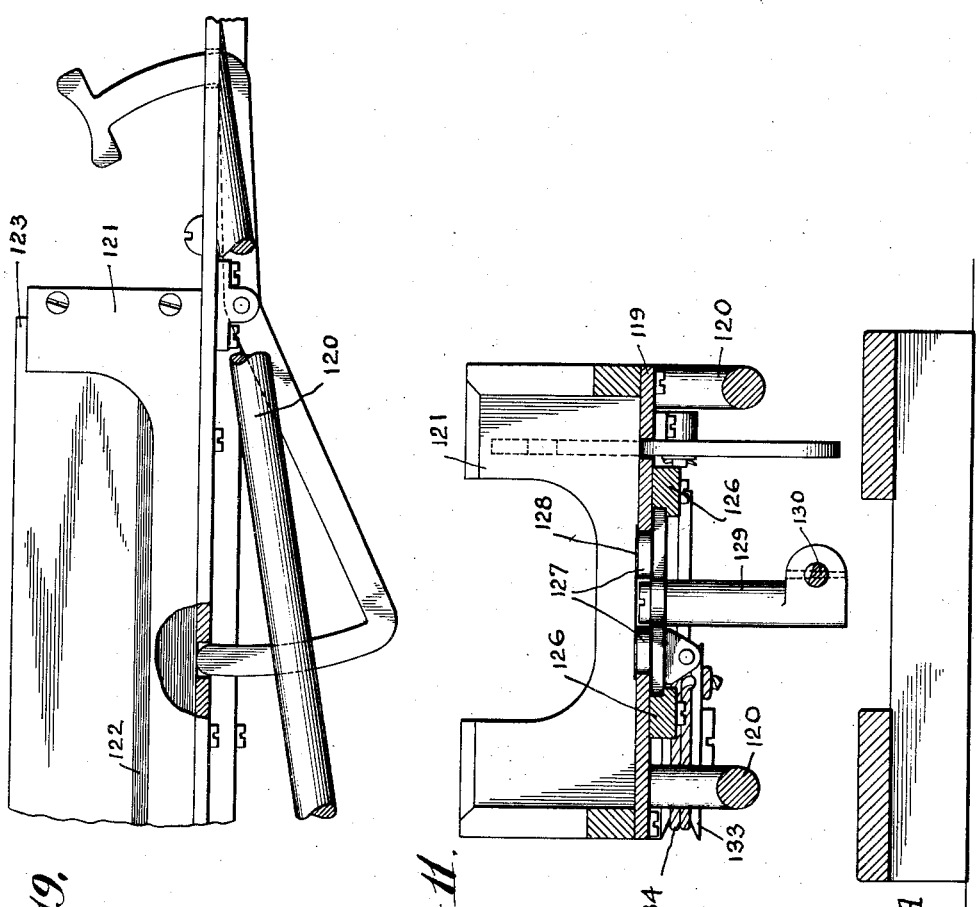

Sept. 1, 1931. J. T. SCHAAFF 1,821,078
PUNCH AND TYPEWRITER CONTROLLING MEANS THEREFOR
Filed Aug. 14, 1924 16 Sheets-Sheet 9
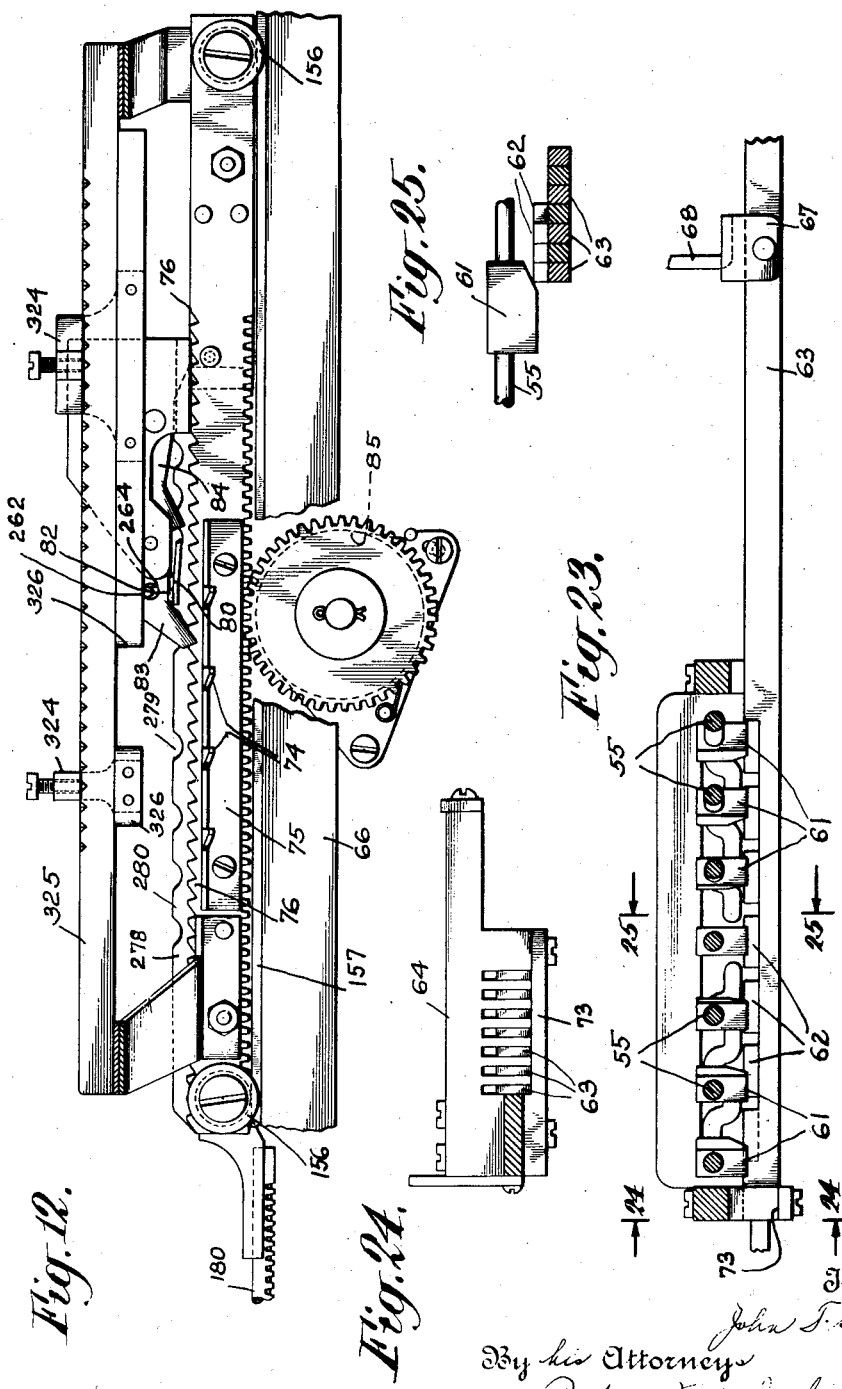

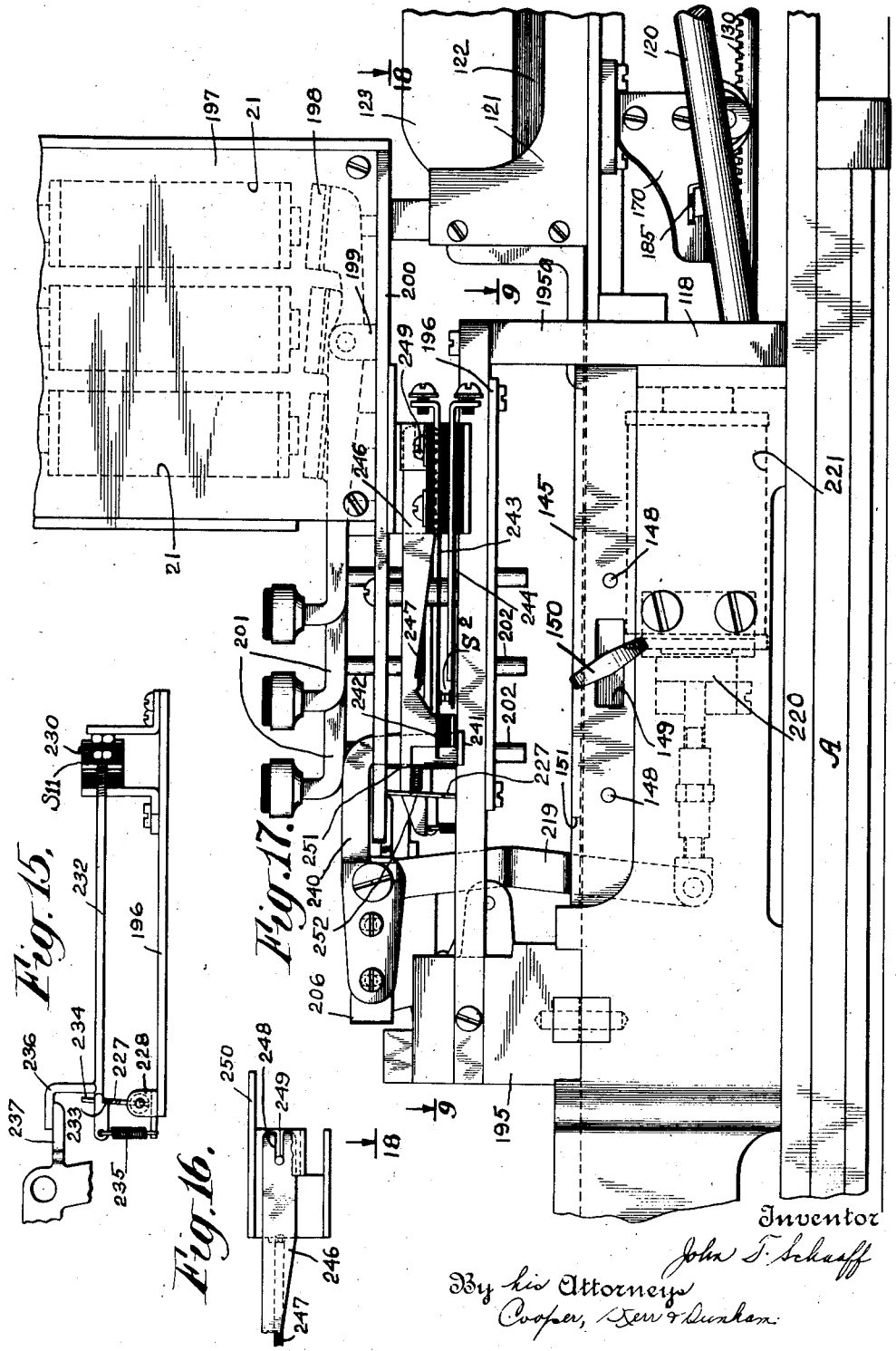

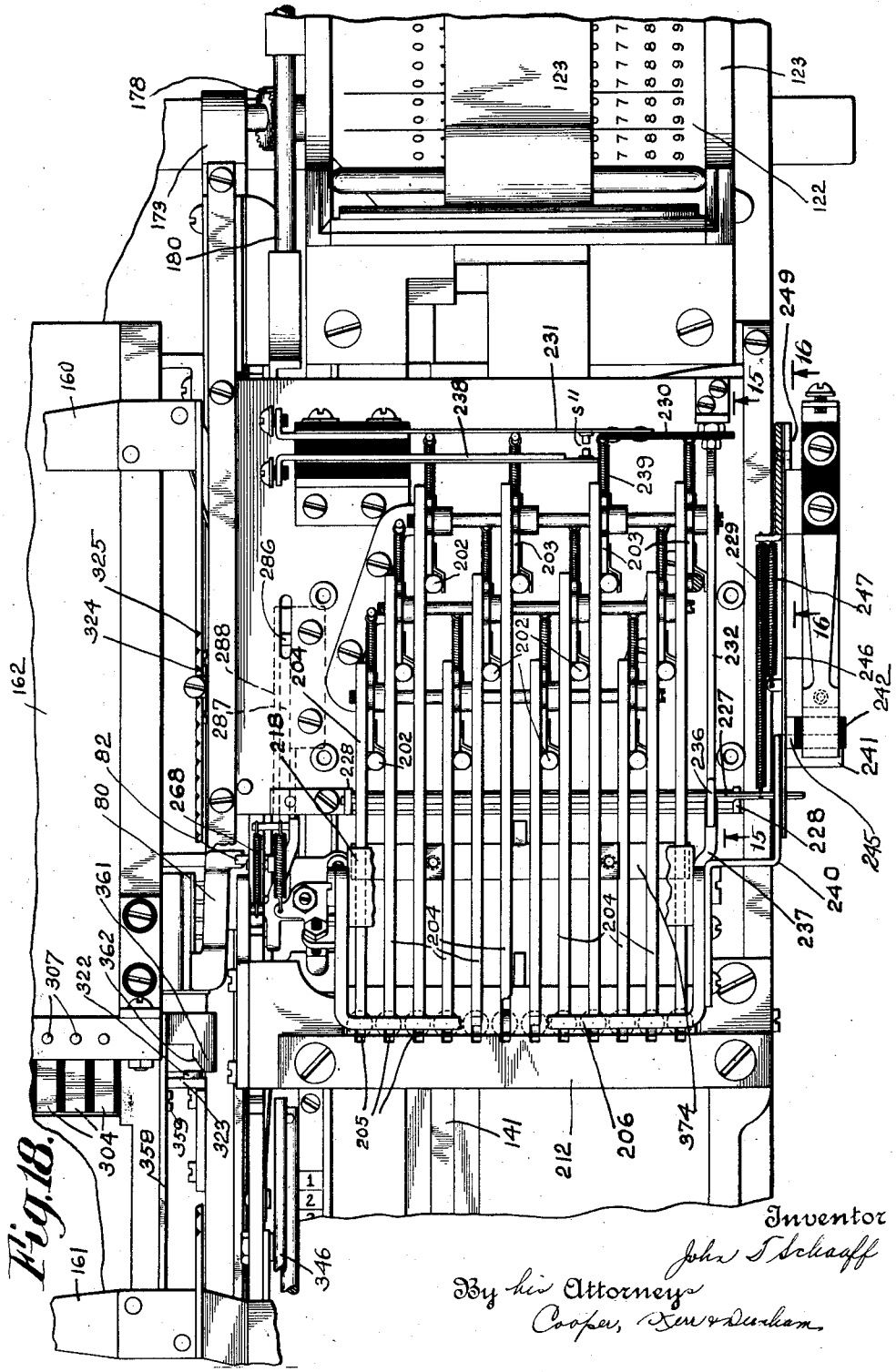

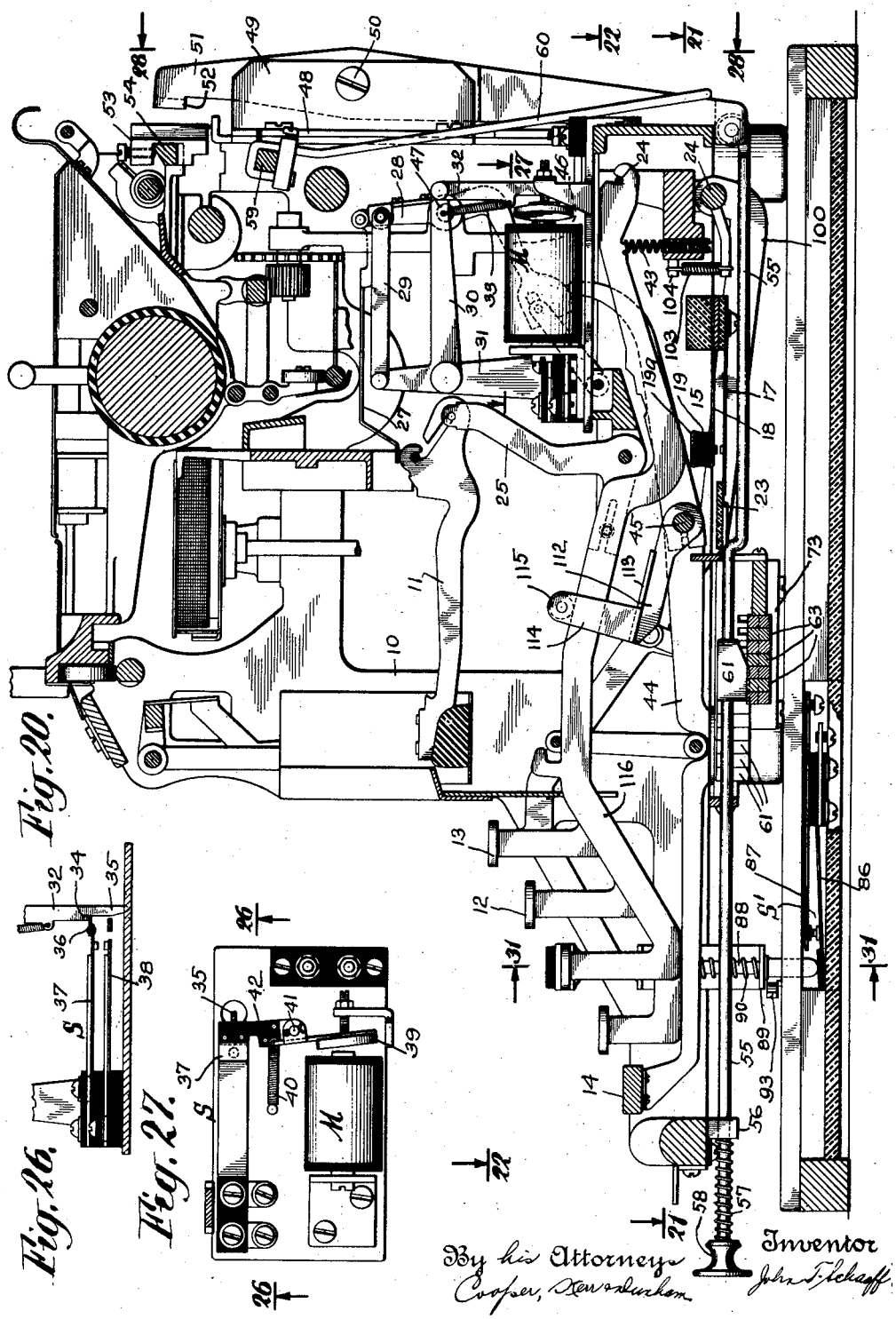

Sept. 1, 1931. J. T. SCHAAFF 1,821,078
PUNCH AND TYPEWRITER CONTROLLING MEANS THEREFOR
Filed Aug. 14, 1924 16 Sheets-Sheet 13
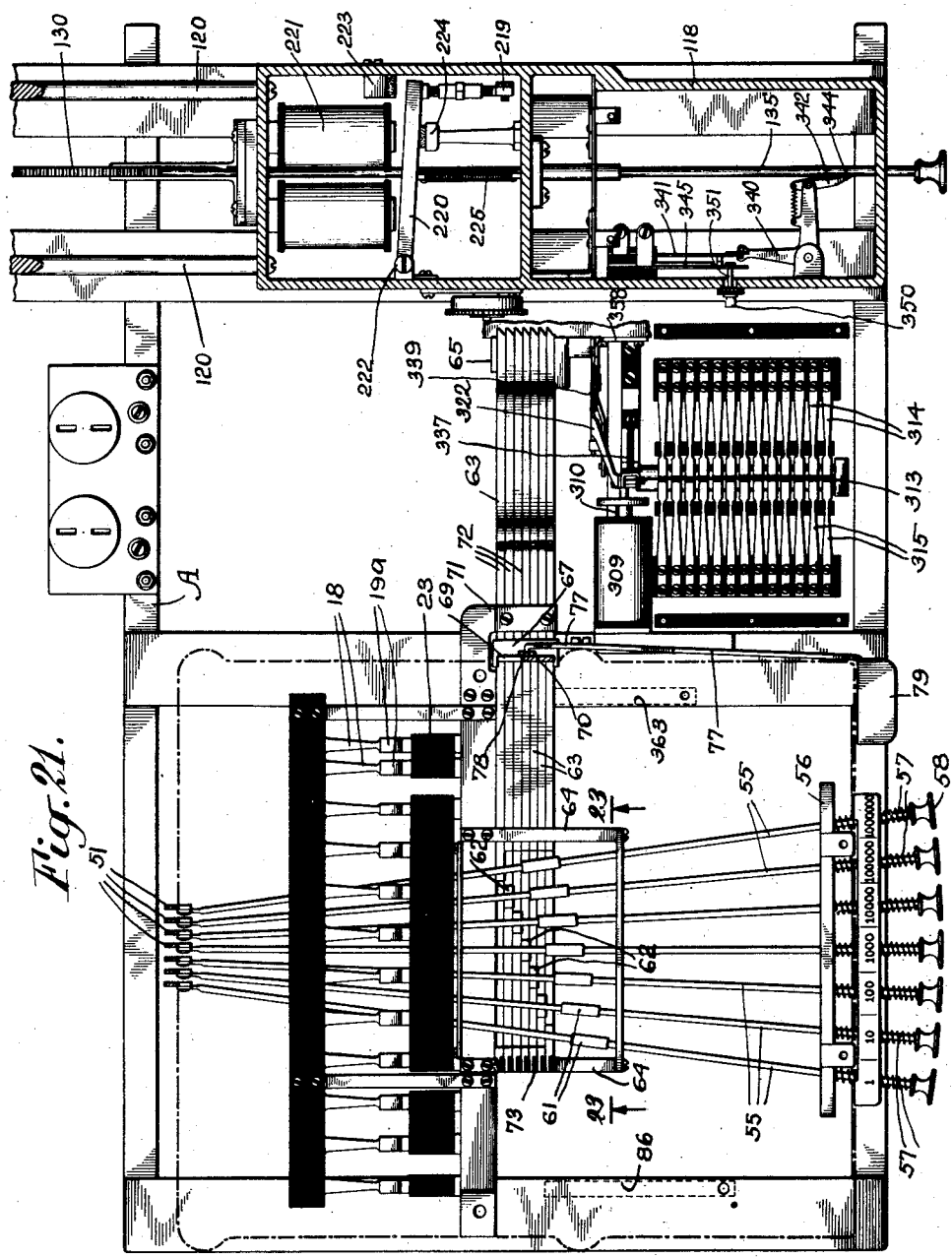

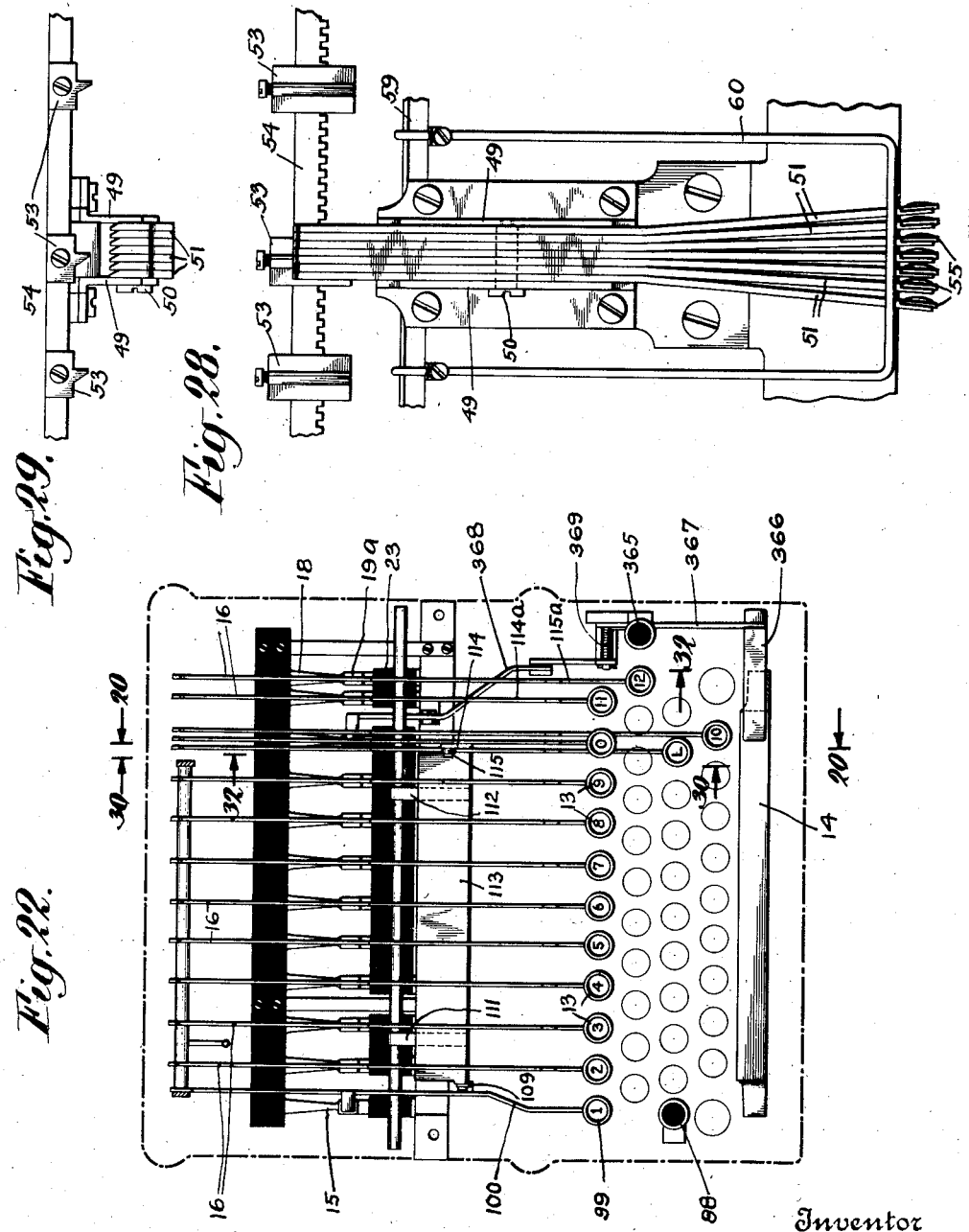

Sept. 1, 1931.　　　J. T. SCHAAFF　　　1,821,078
PUNCH AND TYPEWRITER CONTROLLING MEANS THEREFOR
Filed Aug. 14, 1924　　16 Sheets-Sheet 15
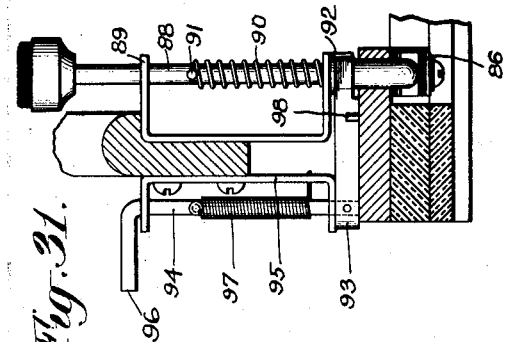
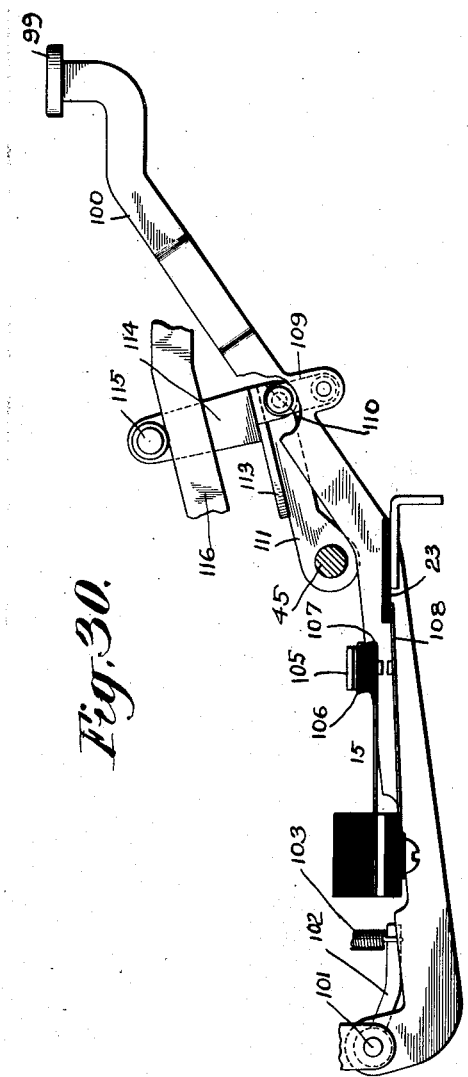
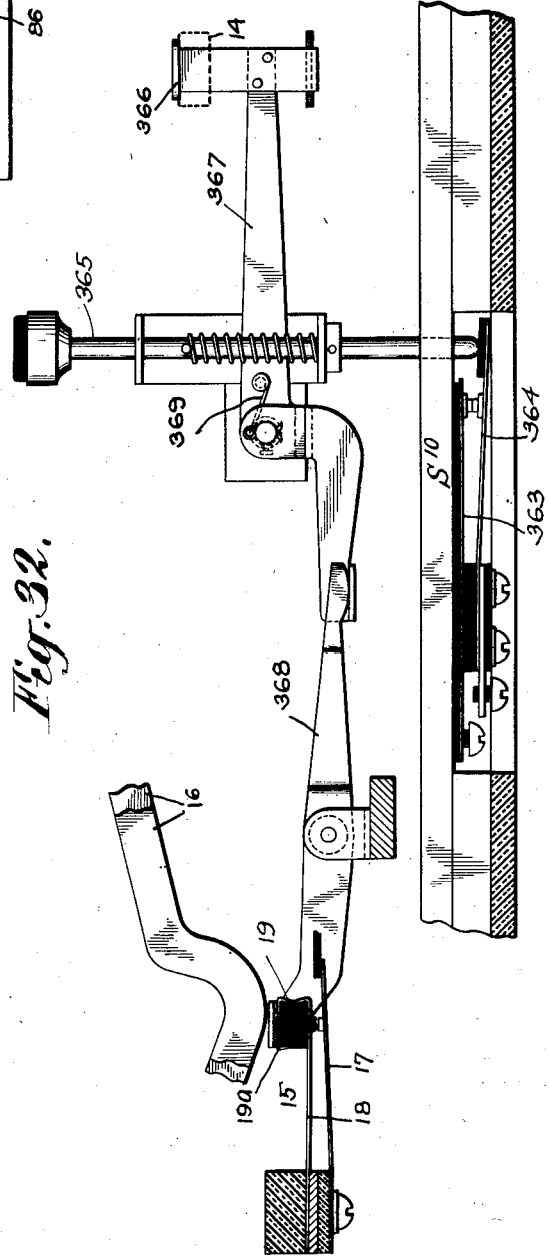
Inventor
John T. Schaaff
By his Attorneys
Cooper, Kerr & Dunham

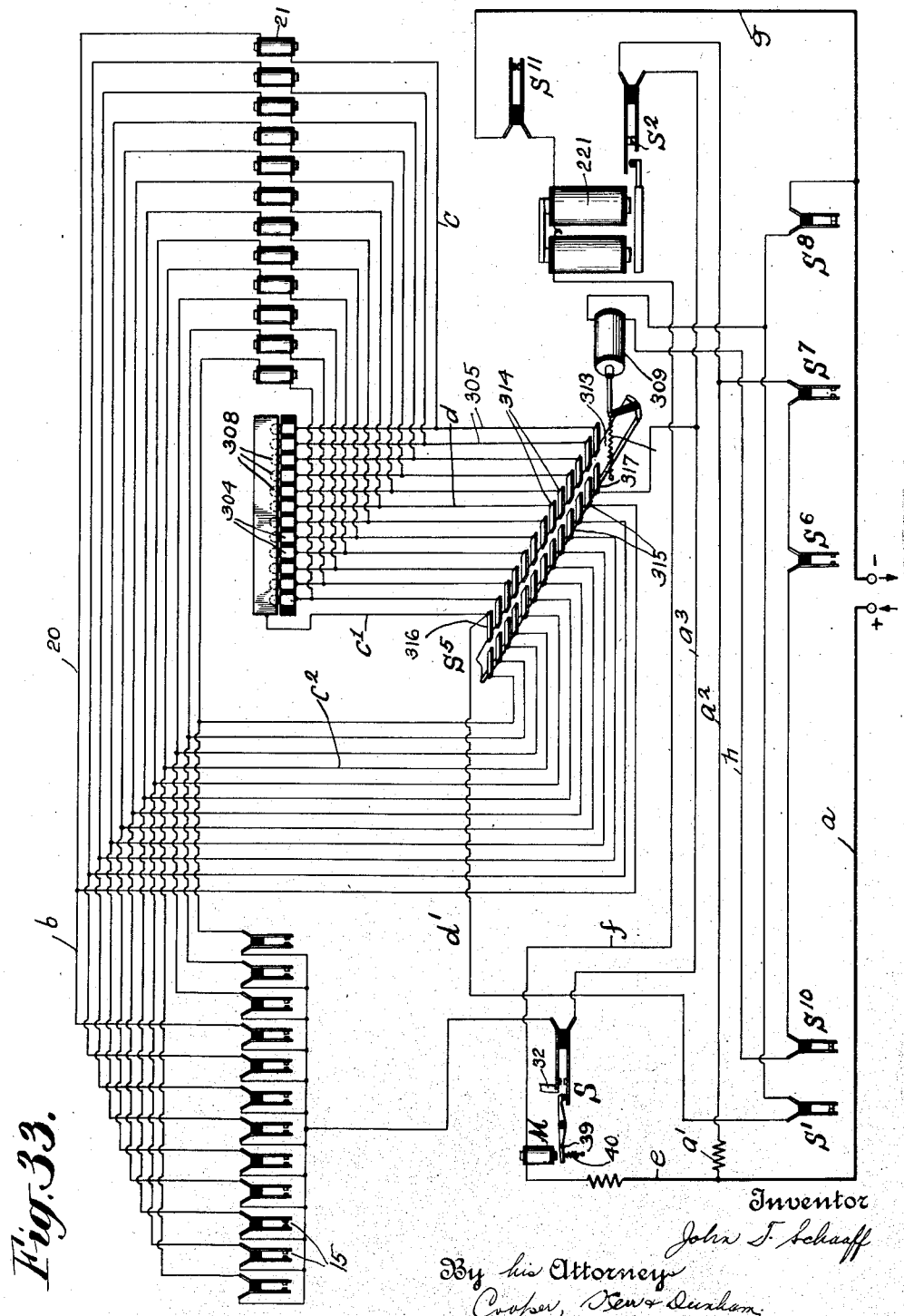

Patented Sept. 1, 1931

1,821,078

UNITED STATES PATENT OFFICE

JOHN T. SCHAAFF, OF WASHINGTON, DISTRICT OF COLUMBIA, ASSIGNOR TO THE TABULATING MACHINE COMPANY, OF NEW YORK, N. Y., A CORPORATION OF NEW JERSEY

PUNCH AND TYPEWRITER CONTROLLING MEANS THEREFOR

Application filed August 14, 1924. Serial No. 731,980.

This invention relates to perforating machines and more particularly to combined printing and perforating mechanism, and is especially adapted for the simultaneous printing of certain records, together with the perforating of record cards which may be subsequently utilized for the tabulation of the various items enumerated on the printed record.

In many instances, in the prior art, machines have been devised for simultaneously printing and selecting punches which were subsequently operated to duplicate in record cards the printed record, but all of these machines, so far as I am aware, have had certain inherent defects which this invention has been designed to obviate.

One of the essential objects of the invention is to provide a simple and efficient coordination of parts by which a printed record may be made and simultaneously therewith the same items of the printed record may be duplicated in a record card, which can be subsequently used for tabulating such items or statistics. Also to provide a machine wherein the items represented by the perforations may be automatically duplicated in other cards, in its entirety or only partially duplicated, and further original data printed on a record sheet and also produced upon the card being punched.

Another object of the invention is the provision of novel mechanism whereby as the card is fed from the hopper into punching position, the carriage which feeds the card through the punching mechanism, is automatically returned to position for engagement with the next card and also in the provision of mechanism for causing a proper engagement of the card carriage with the card, thus insuring positive feed of the card through the punching mechanism at each operation.

Another object of the invention is the provision of mechanism for feeding the card into punching position and simultaneously returning the pattern card to starting position, the movements of the pattern card and the card to be punched being so related that the card to be punched arrives at the punching position simultaneously with the arrival of the pattern card to the starting point for automatic duplication.

Another object of the invention is the provision of mechanism for punching certain information on the card and subsequently utilizing said card for a pattern to duplicate the information thereon, or certain parts of it upon other cards, and arranging a card feeding mechanism in such manner that the card being punched moves along step by step with the pattern card throughout the fields to be duplicated.

Still another object of the invention is the provision of mechanism for feeding a card into punching position, together with automatic means for disconnecting the card feed after the card has been brought to punching position and for returning the card feeding means to normal, or initial position, and further in the provision of automatic means acting upon the full return of the card feeding means to automatically couple a duplicating mechanism, which automatically duplicates the information carried by a pattern card in the card being punched.

Another object of the invention, which is essential to the proper operation of the machine and which avoids certain inherent defects in prior machines of this type, is the provision of simple and effective means for breaking the circuit of the selector magnets immediately after a punch has been operated, so that irrespective of the length of time the operator maintains pressure on the key, the punch will only act a single time and no duplication will occur unless the key is released and again depressed. This obviates the difficulty encountered in certain machines of this type, which would continue to operate and duplicate so long as the key was held down.

A further object of the invention is the provision, in a printing, punching and duplicating mechanism, of means whereby a card to be used in part as a pattern card for automatic duplication may have all of its fields completely punched and only those parts which it is intended to duplicate will be automatically punched in the card to be duplicated, the card feed coming to rest at the end of each duplicating field until the original information has been punched by hand.

Another and a very important object of the invention is the provision of a machine for printing, punching and duplicating such printed and punched records, wherein a plurality of controlling or actuating magnets are employed, together with means for energizing said magnets and subsequently and immediately thereafter interrupting the circuit or circuits of such magnets, so as to prevent undue heating and consequent destruction of the magnets.

A further object of the present invention resides in the provision of means for controlling the punching attachment selectively and automatically whereby the attachment may be controlled by the typewriter keys or by pattern cards or by either to the exclusion of the other.

Many further objects of this invention will appear as the following specific description and claims are read in connection with the accompanying drawings, which form a part of this application and which show one embodiment of the invention.

In the drawings,

Fig. 1 is a perspective view.

Fig. 2 is a top plan view of the punching and duplicating mechanism and showing a portion of the frame for the support of the typewriter.

Fig. 3 is a longitudinal vertical sectional view taken on line 3—3 of Fig. 2.

Fig. 4 is a fragmentary section taken on the line 4—4 of Fig. 2.

Fig. 5 is a section taken on the line 5—5 of Fig. 2, looking in the direction of the arrows.

Fig. 6 is a similar section taken on the line 6—6 and looking in a direction opposite to that of Fig. 5.

Fig. 6a is a section taken on line 6a—6a of Fig. 6.

Fig. 7 is a detail plan view partly in section, showing a portion of the carriage shifting mechanism.

Fig. 8 is a detail side elevation of the parts shown in Fig. 7 and taken approximately on the line 8—8 of Fig. 10.

Fig. 9 is a horizontal sectional view taken on the line 9—9 of Fig. 17.

Fig. 9a is a detail plan view of certain parts shown in Fig. 9.

Fig. 10 is a detail vertical section taken on the line 10—10 of Fig. 3.

Fig. 11 is a detail vertical section taken on the line 11—11 of Fig. 3.

Fig. 12 is a detail longitudinal sectional view taken on the line 12—12 of Fig. 6.

Fig. 13 is a fragmentary longitudinal section taken on the line 13—13 of Fig. 3.

Fig. 14 is a vertical sectional view on the line 14—14 of Fig. 4.

Figs. 15 and 16 are details of a portion of the mechanism for opening the gap in the selector magnet circuits.

Fig. 17 is a detail side elevation of the punching mechanism made on a somewhat enlarged scale.

Fig. 18 is a horizontal sectional view on the line 18—18 of Fig. 17.

Fig. 19 is a detail side elevation of the card magazine with a portion thereof broken away to clearly illustrate the operation of the card lifter.

Fig. 20 is a vertical sectional view taken through the typewriter to illustrate the arrangement of parts, on the line 20—20 of Fig. 22.

Fig. 21 is a horizontal sectional view taken on the line 21—21 of Fig. 20.

Fig. 22 is a detail horizontal sectional view taken on the line 22—22 of Fig. 20.

Fig. 23 is a detail vertical sectional view taken on the line 23—23 of Fig. 21.

Fig. 24 is a sectional view taken on the line 24—24 of Fig. 23.

Fig. 25 is a vertical sectional view taken on the line 25—25 of Fig. 23.

Fig. 26 is a detail vertical sectional view taken on the line 26—26 of Fig. 27.

Fig. 27 is a horizontal sectional view taken on the line 27—27 of Fig. 20.

Fig. 28 is a detail rear elevation looking from the rear of the typewriter mechanism and approximately on the line 28—28 of Fig. 20.

Fig. 29 is a detail top plan view of certain of the parts shown in Fig. 28.

Fig. 30 is a detail sectional view taken on the line 30—30 of Fig. 22 and illustrating in part a connection between the "one" and "L" key of the typewriter mechanism.

Fig. 31 is a detail vertical sectional view taken on the line 31—31 of Fig. 20.

Fig. 32 is a detail vertical sectional view on the line 32—32 of Fig. 22.

Fig. 33 is a diagrammatic illustration of the circuits employed.

In the specific embodiment of the invention, as illustrated herein, I have disclosed all of the mechanism mounted upon a common base or frame-work A, and while the respective elements are here shown arranged side by side, I wish it clearly understood that in practice other arrangements of the different elements or combination of elements may be resorted to without, in any way, departing from the spirit or scope of the invention as defined in the appended claims.

I have generally indicated the respective elements of the combination by the reference characters B, C and D. The typewriter mechanism B, the punching mechanism C, and the reproducing or duplicating mechanism D all have their parts so arranged and coupled that their operation or operations may be carried out in the shortest period of time possible, and with accuracy. The typewriter mechanism B comprises the usual frame-work 10, with type bars 11, and letter and numeral keys 12 and 13 respectively. It is also provided with the usual space bar 14 which, with the letter and numeral keys 12 and 13, control the escapement mechanism and the movement of the platen as is usual. In addition to the control of the escapement and the movement of the platen, the numeral keys 13 in the present instance and certain other keys, which will be hereinafter referred to, operate, with their movement to actuate the type bars, to control certain electrical circuits through the switches 15 located immediately beneath the control levers 16 of certain keys. These switches each consist of a relatively stationary contact 17 and a movable contact member 18, the latter of which is provided with an insulating button 19 supporting a metal plate 19a to receive the impact of the levers 16. All of these switches 15, as shown in Fig. 33, are connected by means of the conductors 20 to the selector magnets 21 and to one side of a selector switch generally indicated at S—5 in Fig. 33. This switch and its associated parts and the selector magnets and their operation will be described in detail hereinafter. The stationary contact 17 of each switch 15 is preferably under some slight tension so that when the movable contact 18 engages the same by the depression of one of the keys, designed to actuate such switch, and subsequently released, it will rise and have its free end come to rest against the underside of an abutment 23 of insulating material secured to the frame of the typewriter in any suitable manner as clearly illustrated in Figs. 20, 21 and 22. Each key lever is as usual, fulcrumed at the rear of the typewriter frame as indicated at 24, and is connected, as usual, with a bell crank 25, which actuates the type bar 11 in the usual manner.

The escapement frame 27 actuated by each numeral key and certain of the letter keys is connected to a pivoted frame 28, which in turn is connected through a link 29 to a bell crank lever 30, pivoted upon a standard 31 and carrying at is free end a contact operating finger 32, normally held by the spring 33 in position to operate a movable contact member. This contact operating finger is, as shown, provided with a shoulder 34 and adjacent its lower end the inner face of such finger is provided with an inclined surface 35 to insure smooth operation of the parts. The shoulder 34 normally is engaged with a projecting tongue 36 of insulating material carried by and projecting from the outer end of a movable contact spring 37, which is adapted to be brought into engagement with the relatively stationary contact element 38 of a switch, indicated as S, and which is arranged in the circuit of the selector magnets. This switch is adapted to close the circuit of a selector magnet which in turn closes the circuit of the punching magnet as will be hereinafter described and is opened immediately after the operation of the punching magnet. In order to effect an automatic release of the contact member 37 so that the switch will be restored to open position, I provide a slow acting magnet M, provided with an armature 39, normally retracted or held away from the core of the magnet by a spring 40. The armature is fulcrumed at 41 and carries on one end a finger 42 of insulating material, which when the armature is actuated by the energization of the magnet M acts to displace the free, lower end of the finger 32 so that the shoulder 34 is removed from the tongue 36 and the spring contact 37 allowed to return to normal position, as shown in Fig. 26. Upon release of the key, which has produced the actuation of the parts just mentioned, it is returned to normal position by the spring 43 of usual construction, and the bell crank 30 and finger 32 are also raised to normal position, the spring 33 acting to pull the finger 32 inwardly so that the shoulder 34 will engage over the tongue 36.

At this point, it may be well to state, in a general way, that the magnet M, which is in series with the punch magnet, is made slow acting in any suitable manner as by the utilization of a copper sleeve, high resistance winding, or the like, so that it does not act until an appreciable time has elasped after the actuation of the punch magnet; thus, it will be seen that irrespective of the length of time which the operator maintains the key depressed the circuit of the selector magnets, controlled through the switch S, is interrupted immediately after the punching operation has taken place, thereby preventing the repeating of the punching and the possible burning out of the selector magnet coils. If the key is immediately released, the parts are immediately restored to normal position ready for a second operation by the same or another key.

I have shown, in the mechanism B, the parts found in an ordinary Number 5 Underwood Typewriter, which include the usual space bar 14 and space bar lever 44 fulcrumed on the transverse rod 45, as is usual, and controlling the arm 46 of the frame 28 connected to the universal frame 27 as usual.

While certain of the letter keys 12 of the typewriter are utilized to operate the type bars and actuate the escapement of the typewriter as usual, and also in this instance effect the closing of the contacts of switch S, no operation of the punching mechanism is produced because of the fact they do not control any switch like 15, one of which is provided for each numeral key and some, but not all of the letter keys, as is clearly shown in Fig. 22. Mounted at the back of the typewriter is a suitable bracket 48 having laterally spaced ears 49 through which extends a fulcrum pin 50, carrying a plurality of tabulating levers 51, each provided at its upper end with a substantially horizontally extending lug or finger 52, adapted to be projected into the path of tabulating stops 53 adjustably secured upon the stop rod 54, which is in turn supported by and movable with the carriage of the typewriter in the usual manner. The lower ends of the tabulating levers are each connected with a push bar 55 sliding in bearings 56, supported beneath the front bar of the typewriter frame as shown in Figs. 20 and 21, and normally held in the position shown in this figure by the springs 57. Each bar is provided with an operating button at its forward end, indicated at 58, and controls the movement of its respective tabulating lever, as will be clearly understood from an inspection of Figs. 20 and 21. The operation of either one of the tabulating levers 51, through the operation of its respective push bar, will cause a partial rotation of the ordinary and well known tabulating bar 59, through the operation of the yoke 60, which has its respective legs connected to said bar 59 and its intermediate portions straddling the lower ends of the tabulating levers 51. This construction is clearly illustrated in Figs. 20 and 28.

The rotation of the bar 59 causes a release of the carriage of the typewriter through the ordinary parts employed, which have not been shown herein, but which are of well known construction. As the carriage is released, the lug 52 of the particular tabulating lever operated is brought into the path of one of the stop members 53, which have been adjusted previously for the proper tabulation of the work in hand.

Each push rod 55 is provided with a cam 61, which is adapted to engage a lug 62, carried upon the upper surface of each one of the punch tabulating levers 63, operable when it is desired to control a spacing of the card carriage in the punching and duplicating mechanism simultaneously with a tabulation of the carriage of the typewriter, as will be more fully hereinafter described.

These tabulating levers 63 are all supported at one end in a comb-like frame-work 64, as shown in Fig. 24, and their opposite ends are raised and supported normally against lateral movement by a bracket 65 carried upon the track rail 66, which is a part of the punching mechanism and supports the card carriage, as will be hereinafter described. At an intermediate point in the length of the levers or bars 63 they are fulcrumed to a yoke 67, carried at the lower end of a vertically shiftable fulcrum support 68, which is provided with a pair of longitudinal slots 69 to receive retaining screws 70, adapted to hold the shifting member in position to slide upon the frame of the typewriter.

Secured to the frame of the typewriter, adjacent the shifting support 68, is an arm 71 carrying a plurality of springs 72, one for each lever or bar 63. These springs normally act to hold the raised end of the bar 63 down upon the bracket 65. The right hand end of the levers or bars 63 normally rests upon the lower shoulders 73 of the comb-like structure with the lugs 62 below the level of the movement of the cam 61. When one of the push bars is pushed inwardly to operate a tabulating lever 51 and release the carriage, as before described, the cam 61 attached to the rod operated passes idly over the lug 62 on a corresponding lever or bar 63 and of course without operating or raising the right hand end of said bar or bars. If, however, the lever fulcrum yoke 67 is raised so as to bring the left hand end of said bars 63 in contact with the upper shoulders of the comb-like frame and position the lugs 62 in a higher horizontal plane, where they will be operated upon by the cams 61, then upon operation of the push rods 55 the right hand end of the rods 63 will be elevated and interposed in the path of teeth 74 carried by a bar 75 secured to the escapement rack 76, which is secured to the card carriage and will be, with said card carriage, described more fully hereinafter.

In order that the fulcrum yoke 67 may be raised when it is desired to space the card carriage of the punching mechanism, at the same time the typewriter carriage is spaced for tabulating work, I have pivoted to the typewriter frame a lever 77 having an inturned rear end 78 engaging in an aperture in the yoke slide 68. The forward end of this lever is provided with a finger piece 79 by which it may be manipulated to raise the yoke 67. It will thus be seen that when the yoke member 67 is in normal or lowered position, the operation of the push rods or any of them for controlling the movements of the levers 51, does not in any way effect an elevation of the right hand end of the corresponding lever 63, so that the operator may step the typewriter carriage along to the respective tabular positions without, in any way, affecting the position of the card carriage. When, however, the finger piece 79 of the lever 77 is depressed and the fulcrum yoke 67 elevated and one of the push rods 55 operated, the cam on that particular rod will then wipe over the lug 62 on a corresponding lever 63 and elevate the right hand end bringing it into the path of the next adjacent tooth on the bar 75, and thus control the movement of the card carriage.

Fulcrumed in bearings, beneath the card table of the duplicating mechanism, is a dog tripping lever 80 with a portion thereof normally held in contact with the upper surfaces of the levers or bars 63 at their right hand ends, as shown in Fig. 6, by a spiral spring 81. Beyond the point of rest of this lever it is extended upwardly and forwardly where it engages beneath a skip lifter wire 82 controlling the stepping dog or pawl 83, operating with the retaining dog 84 to control the proper escapement of the card carriage, as will be hereinafter described. Thus, it will be seen that upon any operation of the levers 63, i. e., an elevation of the right hand ends into the path of the teeth 74 on the tabulating bar 75, would also cause a release of the stepping dog which will permit the card carriage to be stepped forward under the influence of the spring drum 85, mounted upon the frame of the punching mechanism, and geared to the rack 76, which is toothed on its under-surface as shown in Fig. 12.

As before described, all of the numeral keys of the typewriter and certain other keys, the function of which will be described later on, are adapted to operate the switches 15, controlling the actuation of the selector magnets. A selector magnet would be operated when any of the typewriter keys which are electrically connected with the punch are depressed, and there through the slow acting magnet and the punch magnet. Thus, as will be more clearly understood hereafter, a perforation would be made in a card at each operation of that special key of the typewriter. In order to avoid this and permit the operator to work the typewriter entirely independent of the punching or duplicating mechanism, I provide a switch S', consisting of contact members 86 and 87, arranged beneath the frame of the typewriter and preferably attached to the base in any suitable manner. These contacts constituting the switch S' are normally closed, as shown in Figs. 20 and 33, so that the circuit is completed through the selector magnets and their associated switches 15, when any key connected with the punch is depressed. In order that the switch contacts may be opened and the entire punching mechanism be disconnected from the typewriting mechanism, I provide a reciprocating plunger 88 slidably mounted in bracket arms 89 and normally held raised by a spiral spring 90, which surrounds said plunger and is positioned between the lower bracket arm and a transverse pin 91 on said plunger. The outer end of the spring contact 86 lies in the path of the plunger and is provided with an insulating washer to take the thrust of the plunger and prevent any possible short circuit, which might otherwise occur. When the plunger is depressed, the contact member 86 will be separated from the contact of the member 87 and the circuit of the selector magnets will be broken, so that the operator may operate the typewriter without, in any way, affecting the punching or duplicating mechanism.

In order to hold the plunger 88 depressed, I secure to the same, adjacent its lower end, a collar 92, over which is adapted to engage a finger 93. This finger 93 is carried at the lower end of a shaft 94, journalled in upper and lower arms of a bracket 95, carried by the side of the machine. The shaft 94 is provided at its upper end with an operating lever 96 by which the finger 93 may be placed in position over the collar 92 when it is desired to lock the plunger in depressed position, so as to maintain the switch open for a considerable length of time. The shaft 94 is provided with a torsion spring 97 having one end attached to the shaft and the opposite end attached to the bracket and which normally acts to throw the finger 93 away from the plunger out of the path of the collar and against a stop 98. When the plunger is depressed and the lever 96 moved toward the plunger, the finger will be thrown over the top of the collar 92 and the plunger locked in lowered position. Upon a further and quick depression of the plunger the friction of the collar on the finger will be released and the spring 97 will carry the finger over against the stop pin 98 and permit the plunger to rise under the action of the spring 90, thus permitting the member 86 to come into contact with the member 87 of the switch and restore the circuit of the selector magnets at this point. After this, each operation of a numeral or other key connected with a selector magnet, will cause energization of the corresponding selector magnet and an operation of the punching mechanism.

In the present construction of typewriter, and it will be understood that I am referring particularly to the Underwood which has been used in the construction of the machine now being used by applicant and illustrated in this application, the "L" key is used in the lower case for "one" and also for small "l", but if this key were employed to close the switch and thereby control the selector magnet to punch "one" in any field of the card being punched it would not operate properly for the upper case and could not be used independently of the punch. I, therefore, add a "one" key, indicated at 99 on the drawings, which "one" key is adapted to control a switch 15 in a similar manner to all other numeral keys and I couple this "one" key with the "L" key bar lever, so that when it is desired to punch a "one" in any field of the card being punched the small l type bar will also be actuated and a small l will be struck upon the sheet carried by the platen of the typewriter.

The "one" key bar is illustrated at 100 and as shown in Fig. 30 is fulcrumed to a suitable part of the typewriter frame at 101. This part or shaft carries a short arm 102, which has its free end connected to one end of a spiral spring 103, the opposite end of which is secured, as shown in Fig. 20, to a projecting finger 104 on the typewriter frame. The spring 103 acts to return the key to normal raised position. The bar 100 also carries a laterally extending lug 105, adapted to bear upon the insulating disk 106 secured to the outer end of the movable contact spring 107, which is arranged to be moved upon depression of the "one" key into engagement with a stationary contact spring of a switch 15 controlling the "one" selector magnet. This switch 15 is similar to all other key operated switches and needs no further description.

Depending from the under-side of the key bar 100, is a lug 109, which is connected by means of a link 110 to a lever 111, secured to the shaft 45, which extends across the machine and which carries a similar lever 112 coupled to the lever 111 by a cross-bar 113. This cross-bar has attached to the end adjacent the "L" key bar a vertical arm 114 carrying at its upper end a roller 115 engaging upon the top of the "L" key bar 116. It will thus be seen that upon depression of the "one" key bar, the "L" key bar will also be depressed, so that the L type bar will be actuated to print a letter upon the sheet carried by the platen and simultaneously the switch contacts 107 and 108 will be closed to energize the one selector magnet. When the "L" key bar is depressed, the "L" type bar will be actuated but the key bar will move down and away from roller 115 without actuating switch 15.

In place of the asterisk and fraction keys, I employ keys which actuate switches for controlling selector magnets for punching November and December positions in the date field of the card being punched and the key caps for these keys, which I have indicated at 114a and 115a respectively, may be lettered with the abbreviation of November and December, or, if desired, may contain numerals indicating the position of the month in the year, viz "11" and "12".

The punching mechanism

The punching mechanism, which has been generally indicated by the letter "C", comprises a table or card support 117 which, in the present instance, is the upper surface of a frame-work 118, supported upon the base or platform "A". This table extends rearwardly of the base a considerable distance and has this rearward extension, which has been indicated at 119, supported in any suitable manner. I preferably employ the diagonally arranged rods 120 extending from the lower portions of the frame-work 118 to the underneath side extension 119, as shown in Fig. 3. The extension 119 provides for the support of several parts, as will be hereinafter described, and carries a card hopper 121 of any suitable construction, in which is placed a plurality of cards indicated in Fig. 3, by the reference character "122" and which are held down upon the table by a removable weight 123. These cards are adapted to be fed forwardly over the table one at a time, by the card feeding knife 124 slidably mounted within a longitudinal slot 125 formed in the table 117 and extension 119. This card knife is supported in guideways 126 secured to the underside of the extension and arranged to hold the upper surface of the knife slightly above the upper surface of the extension. The feed knife 124, as shown in Fig. 2, comprises a pair of spaced blades connected together at their rear end and provided at their forward end with reduced extensions 127 forming card-engaging shoulders 128, which in a normal position of the knife lie immediately behind the rear edge of the lowermost card of the stack in the hopper.

As is well understood, the extensions 127 are flush with the upper surface of the table extension 119 and lie in contact with the undersurface of the lowermost card of the stack, while the shoulders 128 are of a thickness equal to the thickness of the card, so that upon forward movement of the knives, as will be hereinafter described, the lowermost card is shifted from beneath the stack and carried forwardly over the table into position for punching and engagement by the card carriage.

In order that the cards may be fed forwardly, one at a time, from beneath the stack in the hopper, I secure to the rear end of the knife 124 a depending arm 129, which has connected to it a pull rod 130 (Fig. 3), extending longitudinally beneath the table 117 and the extension 119. The forward end of the rod is slidably mounted in a bearing 131, formed in the frame-work 118, and at its forward end is provided with a button 132 for the proper manipulation of the same. After the rod has been pulled forward, carrying with it the feed knives and the lowermost card of the stack, it is automatically returned to normal position by a spring drum 133, journaled upon the under-side of the extension 119 and connected to the knife 124 by a flexible cable 134, through a short pull rod 135, which is slidably mounted in a bracket 136 and carries a collar 137 between which, and one arm of the bracket, is arranged a spiral spring 138. This spring is provided for taking up the shock incident to the stopping of the knife on its return movement and in order that this shock may be further eliminated, I provide a stop 139 having a cushion 140 arranged to receive the impact of the knife.

The table 117 is provided with a longitudinal groove 141, the purpose of which will be hereinafter described, and in order that the card being fed over said table by the knife and subsequently by the card feeding carriage, may have its marginal side edges held flat against the table, I provide guide flanges 142 and 143, the former of which has its rear portion provided with a lateral extension 144 spaced from and overhanging the table 117, as shown in Fig. 6. The opposite flange 143 is cut away beneath the punching mechanism and in its place I provide a removable retaining flange 145, which lies flat on the table and is provided with a reduced lateral extension forming a card engaging shoulder 146 and a retaining guide 147. The retaining flange is L-shaped in cross section and the vertical leg thereof is provided with apertures to receive centering pins 148 and with a longitudinal slot 149, which permits the passage of the lock button 150 threaded into the frame-work 118. When the retaining flange is placed in position on the table and the button given a quarter turn, it will lock the flange in position with the guide 147 overhanging the card. This retaining member 145 is made removable, so that in case a card fails to feed through the punching mechanism properly, the member 145 may be removed and the card slipped out of the machine and a new card fed into punching position over the table. The retaining member 145 is slotted at 151 for a purpose to be hereinafter described and the rear end of the guide 147 is upwardly inclined, so as to facilitate the passage of the card therebeneath.

I also provide a depending finger 152, shown in Figs. 3 and 6. Should the card buckle in the center when being fed over the table, its entrance into punching position between the stripped plate and die, to be hereinafter described, will be assured, the finger 152 guiding the card between these parts and holding the same flat upon the table. This finger is attached to and depends from a rearward extension of the punch carrier 153 and its lower end is spaced away from the card table a distance slightly greater than the thickness of a card being fed over the table.

At the forward end of the card hopper 121, I provide a card gate 154, which is supported upon the hopper with its lower edge spaced above the table extension a distance slightly greater than the thickness of a card or probably 2 to 4 thousandths of an inch more than the thickness of a card, so that as the knife feeds the lowermost card forward from beneath the stack the next superposed card cannot be fed forward by friction, thus avoiding the feeding of two or more cards to the punching mechanism at the same time. The forward end of the card hopper carries an angle piece 155, which is adapted to hold the card down on the knife as the rear end passes beneath the gate from the card hopper into its position for engagement by the right hand or rear end of the card-supporting carriage.

The card-supporting carriage comprises the rack 76, which has journaled adjacent opposite ends suitable rollers 156, which travel over the track 157 carried by the framework 118 at one side of the table. This rack bar is provided adjacent opposite ends with laterally extending arms 158, 159, the front one of which is arranged to be engaged with the forward end of the card and the rear one of which engages the rear of the card as it is fed forwardly from the feed hopper into punching position. On the opposite side of the rack bar, I provide additional arms 160 and 161, which extend laterally from their support upon the rack bar over the duplicating table 162 to be hereinafter described.

The arm 159 is provided with a pivoted card feeding detent 163 and a shoulder 164, adapted to ride upon the table 117 and a card abutment 165 depending from the shoulder and arranged to fit within the groove 141. This detent is arranged to drop behind the card, after it has been fed into punching position by the feed knife 124, at which time the forward end of the card will be in engagement with the abutment 166 carried on the front arm 158. Thus, it will be seen that the card, when in position to be fed beneath the punches as the escapement is operated to move the rack 76 through the action of the spring drum 85, will be retained between abutments on the front and rear arms. When the rack is fed forwardly, as will be more clearly described hereinafter, the abutment 165 of the arm 159 pushes the card between the stripper plate and die of the punching mechanism.

The forward arm of the card supporting carriage, in addition to having the abutment 166, is also provided with a card retaining detent 167 pivoted to the abutment 166 and when free is permitted to swing by gravity or under the influence of a spring, if desired, over the front end of the card to retain the same in engagement with the abutment 166. When the carriage is in its fully retracted position to engage a card previously fed from the hopper, the forward edge of the detent engages with the stripper plate and is thus held out of the path of the card but just above it. Immediately, however, that the carriage begins its forward movement, the detent being carried out of engagement with the stripper plate, is restored to card retaining position, as shown in Fig. 1. When the card carriage is in its extreme forward position, the front end of the detent is retracted into a plane with the face of the abutment 166 through the action of a spring 168 contacting with the depending leg of a bell crank lever 169, pivoted to the arm 158 and having its forward horizontal end connected to the detent. When the detent is thus withdrawn, a card can be readily removed from the table.

It will be well understood, from an inspection of the drawings and the description which follows, that as the knives feed the card forwardly into punching position, the card supporting carriage is moved rearwardly to engage the card and subsequently carry the same through its respective positions, beneath the punches as controlled by the escapement. It will also be noted, from the following description, that I have provided means for advancing the card slightly beyond the position to which it is fed by the knives and beyond the engaging end of the detent 163 in order that the card may be more certainly advanced to the point where it will be in proper position for punching and the detent 163 brought into contact with the rear edge of the card. I will now proceed to describe the mechanism which brings about the movement of the card supporting carriage.

Depending from the table extension immediately beneath the forward end of the card hopper is a bracket 171 having adjustably secured thereto a bearing member 170. One end of a diagonally positioned shaft 172 is journaled in bracket 171. The opposite end of the shaft 172 is journaled in a bearing 173, secured to the frame-work 118. Mounted upon the end of the shaft adjacent the bearing 171 is an over-running clutch 174, one element of which is in the form of a pinion 175 loosely mounted upon the shaft and arranged to engage a rack 176 formed on the upper surface of the rod 130. The other element of the clutch 174 is in the form of a sleeve 177, which is splined to the shaft so that when it is clutched up with the element 175 and the pinion rotated through the forward movement of the rack 176, the shaft will also be rotated. During the retrograde movement of the pull rod the ratchet teeth of the element 175 operating upon the ratchet teeth on the element 177 force the latter element away from the pinion and the pinion then rotates idly on the shaft without rotating the same.

On the opposite end of the shaft there is loosely journaled a pinion 178, which has a slight angular movement with relation to the shaft for a purpose which will be presently described. This pinion 178 is in mesh constantly with a rack 179 formed on the under-surface of an extension rod 180, projecting rearwardly from the rack bar 76. The pinion 178 is provided with a collar having a slot 181 formed therein through which or into which projects a stud or pin 182 rigid with the shaft 172, so as to limit the angular movement of the pinion, with respect to the shaft, the pinion being normally held with the pin in engagement with one end of the slot by means of a torsion spring 183, one end of which is connected to the shaft and the other end of which is connected to the pinion.

When the pull rod 130 is operated or drawn toward the operator the tension on the spring 183 is sufficient to rotate the pinion and draw back the carriage without flexing the spring. When the carriage has been drawn all the way in and its movement arrested then this spring yields and allows a slightly greater movement of the card feeding mechanism, thus ample clearance is assured for the detent 163 to drop behind the card. Upon the rearward movement of the pull rod the card carriage moves forward a short distance and is stopped by the escapement dog and the pinion clutch teeth ride idly over the clutch teeth on the collar, forcing the collar away from the pinion against the tension of the spring 184. This spring is connected at one end to the frame-work 118 and at the opposite end through intermediate parts to one arm of a bell crank lever 185. This lever, as shown in Figs. 7 and 8, is pivoted to the bearing support or bracket 171 and has the leg opposite that connected with the spring 184, connected to the collar 177 through a link 186. This link has a laterally turned end 187, which lies in the path of the lever 188, pivoted to the leg of the bell crank lever 185 at 189. This lever has a hook projecting laterally therefrom, as shown at 190, to which the spring 184 is connected. The opposite end of the lever forms a pawl 191 adapted to engage the side wall of a notch 192 formed in the pull rod 130 when said pull rod is in its extreme rearward position. When the pawl 191 drops into the notch 192, the lever 188 operates upon the lateral extension 187 of the link 186 and shifts the collar laterally so that the shaft 172 is free to turn through the forward movement of the card carriage rack 179, operating upon the pinion 178. When the card carriage is in its foremost position and the card previously punched has been removed and it is desired to feed a new card into punching position, the first eighth of an inch movement of the pull rod 130 toward the operator will cause the notch 192 to cam the pawl 191 out of said notch and permit the bell crank lever 185 to force the collar 177 into clutching engagement with the pinion. The pinion will be rotated and the shaft 172 driven thereby, as previously described.

The rod extension 180 is supported in a bearing 193 so as to prevent the upward thrust of the pinion 178 from disengaging the rack which would cause an untimed operation of the parts. I also provide a stop 194 which projects from the frame-work 118 rearwardly and acts as a stop for the depending member 129.

Spaced above the table 117 and supported by means of standards 195 and 195a is a plate 196, upon which is mounted all of the punch controlling mechanism, with the exception of the selector magnets and above this is arranged a box or container 197, holding all of the selector magnets 21. Each selector magnet 21 is provided with an armature 198 pivoted to vertically arranged supports 199, extending upwardly from the plate 200, forming the bottom of the box 197 and lying parallel with the plate 196. The armatures of the selector magnets are provided with forwardly extending levers 201 which may have manipulating keys or buttons attached thereto, so that the movement of the armatures may be controlled manually and independently of the current set-up when the circuits are closed at the typewriter keys or by the automatic switch to be hereinafter described. These levers overlie vertically movable plungers 202 slidably mounted in the plates 196 and 200, as is clearly shown in Figs. 3 and 17. Each plunger 202 has one leg of a bell crank lever 203 slidably connected thereto, the opposite ends of said levers being connected to separate controlling slides which hereinafter will be called interposers and are indicated at 204. These interposers are each provided with a notch 205 in the upper portion of its forward end, so as to permit the ready downward movement of the punch actuator 206 when none of the selector magnets have been energized. When anyone of the selector magnets has been energized, the armature of said magnet will be attracted and the outer end of the levers 201 will be depressed, thus forcing down its respective plunger and operating the bell crank attached thereto to shift the corresponding interposer, so that the notch 205 is carried out of the path of the punch actuator 206 which, if then operated, would be brought directly into contact with the upper surface of the interposer and depress the same.

Each one of the interposers has its forward end arranged over a punch which is slidably mounted in a bridge piece 207 extended across parallel with the table and carried by the standards 195 and also in a stripper plate 208 located immediately beneath the bridge piece but spaced therefrom and forming an abutment for the lower end of compression springs 211 which normally act to elevate the punches. The punches are indicated at 209 and are each provided with a shoulder 210 adjacent its upper end against which the upper ends of the springs 211 abut. As shown in Fig. 5, the standards 195 support a comb-like structure 212, the teeth of which form spaces 213 for guiding the forward ends of the interposers so that they are properly held in alignment with the upper ends of the punches. The upper portion of the combs is cut away so as to permit of the downward movement of the actuator 206, but its lower parts are extended rearwardly a sufficient distance to, at all times, insure proper guiding of the movements of the interposers.

As will be seen from an inspection of Figs. 3 and 5, the card passes between the stripper plate 208 and a die 214 fitted in the table 117 and having its upper surface flush with the upper surface of the table. The die is provided with a plurality of openings 215, one for each punch, which receive and pass the disks punched out of the card. These disks or punchings drop into a chute 216 and are discharged through an opening 217 in the base, if desirable, into any suitable receptacle. The use of the chute prevents the disks or punchings from getting into any of the adjacent mechanism.

As shown in Fig. 6, the punch actuator 206 is U-shaped in plan view and its legs are pivoted to lugs 218, carried by the plate 200, with its connecting portion overlying the notches in the interposers. Secured to one leg of the actuator is a lever 219 pivotally connected at its lower end to the armature 220 of an electromagnet 221. This electromagnet is positioned between the plate 117 and the base A, as seen in Figs. 6 and 17. As shown in Figs. 6 and 21, the armature 220 is pivoted to a bracket 222 and operates between stops 223 and 224, the latter of which limits its movement away from the core of the magnet when operated upon by the spring 225. The stop 223 is provided to prevent the armature from coming into direct contact with the core of the magnet and thus sticking.

Each interposer 204 is provided with a notch 226 on its under surface, which notches are aligned across the punching mechanism when the interposers are in retracted position. These notches are arranged to receive an interposer stop 374 and a common switch operating bar 227 which is pivoted to lugs 228, rising from the plate 196. This bar 227 is normally held in retracted position by a spring 229 and is connected to the insulating finger 230 of a movable switch contact element 231 by a link 232. This link 232 has its free forward end provided with a shoulder 233, which is engaged by the forward side of the bar 227 and the link is held down in a guiding notch 234 of the bar by a spring 235. The free end of the link 232 is also provided with a hook 236, which is engaged over a laterally projecting finger 237 projecting rearwardly from the rear leg of the actuator as viewed in Figs. 17 and 18. When anyone of the interposers is shifted forward so as to have its front end in the path of the actuator 206, the bar 227 will be rocked on its pivotal connection and engaging the shoulder 233 will pull upon the link 232 and bring the movable contact element 231 into engagement with the stationary contact 238 thus closing the circuit of the punching magnet which then pulls up its armature 220 and, through the lever 219, rocks the actuator against the upper surface of the selected interposer, which communicates its motion to the punch, thereby driving the same through the card and die. As the actuator is rocked upon its fulcrum, the tongue or finger 237 is elevated and engaging the hook 236 lifts the free end of the link out of engagement with the bar 227 against the tension of the spring 235 and permits the spring contact 231 to draw the link rearwardly and, at the same time, break the connection between the elements 231, 238. Thus, the circuit of the punching magnet 221 is broken immediately after the operation of the actuator, irrespective of the length of time which the bar 227 may be held in its forward position as actuated by the interposer. The interposers are returned to normal inactive position by means of the spring 229 and by means of independent springs 239, connecting one leg of each bell crank 203 with the plate 200. It will be understood, of course, that the actuated interposer and the bar 227 are not returned to their normal or inactive positions until the circuit is broken upon the selector magnet, which has been energized. When the circuit of the selector magnet has been broken and the bar 227 returned to normal position, the link is drawn downwardly by the spring 235, so that the bar 227 is again engaged with the shoulder 233 for a repeat operation of these parts upon the actuation of another selector magnet.

In order that the circuit of the selector magnet may be broken (and I preferably arrange the following parts so that they operate a predetermined time before the opening of the contacts 231, 238), I provide a laterally and rearwardly extending arm 240 having a horizontally disposed foot 241, which engages beneath an insulating disk 242 slidably mounted under the free terminal of a movable contact spring 243, adapted to engage a contact on the stationary member 244 of a selector magnet controlling switch S².

The disk 242 is carried by the laterally extending foot 245 on a latching member 246, which is normally retracted by a spring 247 connected to the member and to the plate 196. The member 246 is provided with an open slot 248, which receives a pin 249 carried by a bracket 250 secured to the key plunger guide plate 196. The forward end of the member 246 is provided with a deep notch 251, one wall of which forms a shoulder 252, which engages over the bar 227. When the bar 227 is moved forwardly under the actuation of one of the interposers, the member 246 will also be shifted forwardly by reason of the engagement of the bar 227 with the shoulder 252 and carry with it the insulating disk 242 carried by the foot 245, but without in any way affecting the movable contact spring 243. This shifting of the interposer, as has been previously explained, closes the circuit of the punch magnet 221 through the springs 231 and 238, causing the operation of the actuator 206 and lifting the foot 241 which, contacting with the under side of the foot 245, lifts the insulating disk 242 and the spring 243 and breaks contact between the spring 243 and the stationary member 244 of the switch; the forward end of the member 246 being raised so as to carry the shoulder 252 out of engagement with the bar 227; the spring 247 can then act to return the latching member 246 to its rearmost position with the foot 245 still holding the spring 243 separated from the contact member 244.

When the circuit of the punch magnets is broken, which is accomplished immediately before the breaking of the circuits of the selector magnets, the foot 241 will be lowered but the latching member 246 will have its forward end resting upon the bottom of the guide notch formed in the bar 227 and the contacts 243, 244 held in open position until the bar 227 and the operated interposer return to normal position of rest, at which time the forward end of the latching member 246 will be pulled downwardly under the action of the contact spring 243 to the position shown in Fig. 17, thus restoring the circuits of the selector magnets for subsequent operation by depression of another or the same key.

Journaled at one end in a lug 253a and at the opposite end in a bearing plate 267, both carried by the bridge piece 207, is a shaft 253, upon which are loosely mounted arms 254 attached together by the so-called universal bar 255. This bar lies in a somewhat higher plane than the shaft and is in contact with the under-surface of the interposers adjacent their forward ends. Secured to the bar 255 is a laterally extending finger 256 carrying an adjusting screw 257 which bears upon a projection 258 carried by the pawl or dog actuating cross-head 259 loosely mounted upon the shaft 253 and carrying oppositely extending integral arms 260 and 261, the former of which is provided with a laterally extending pin 262 for engagement with an enlarged opening 264 in the stepping dog 83, also loosely journaled on the shaft. The opposite arm 261 is provided with a laterally extending pin 266, which fits in a slot formed in the locking dog between its pivotal connection on the bearing plate 267 and its engaging end.

When the bar 255 is rocked on the shaft 253 the rearwardly projecting arm on the cross-head 259 will through the pin 262 lift the stepping dog out of the notch in the rack bar 76 and at the same time the forward arm 261 will depress the locking dog 84 into a notch in the rack bar 76 and thus hold the carriage against forward movement.

At this time the spring 268 advances the stepping dog a short distance (this being permitted by the loose connection with the pin 262 and with the shaft 253) so that the engaging end of this dog moves a sufficient distance to rest upon the top of the next tooth. When the locking dog is again released or raised out of the engagement with the rack bar by the elevation of the universal bar 255, the stepping dog will ride down the incline of the tooth with which it is engaged and be brought into contact with the shoulder of the next tooth, through the action of the spring 268 as the rack advances. This escapement, which has just been described and which controls the advance of the card supporting carriage, as the card is punched, is well known in this art and is very clearly described in Letters Patent No. 1,426,223, granted to me on August 15, 1922, and, therefore, needs no further description herein.

As has been previously mentioned herein, the machine embodies in addition to the nine numeral keys, a "12" key or December key and a November key, which is also utilized to space the carriage over a field in the card which it is not necessary or desirable to punch. This November key has an interposer actuated by a selector magnet, which interposer lies over an arm 269 fulcrumed on the shaft 253 and carrying a depending finger 270. This finger is arranged to engage one laterally projecting arm 271 of a toggle lever 272 pivoted to the underside of a plate, projecting horizontally from the bridge member 207 at the front of the machine. The other link 273 of the toggle lever is pivoted at 274 to the toggle lever 272 and also connected at this point is the skip lifter wire 82. The opposite end of the link 273 of the toggle lever has engaged therewith a leaf spring 275 also carried by the plate, upon which the toggle lever is fulcrumed.

When the interposer which is operated by the selector magnet controlled through the November key is moved forward and the actuator 206 depressed, through the energization of the punching magnet 221, the arm 269 will be depressed actuating the escapement as before and causing the finger 270 to shift the arm 271, so as to carry the joint between the links 272, 273, beyond the center, thus shifting the skip lifter wire 82 across the rack 76.

As shown in Fig. 6, the skip lifter wire is provided with a reduced end 276 and a cam 277, adapted to operate over a controlling bar 278, secured to the rack bar 76 opposite the rack bar 75. This bar 278 is provided with a plurality of notches 279 and intermediate raised portions 280. The reduced end of the skip lifter wire, as shown in Fig. 12, is arranged beneath the engaging end of the stepping dog 83 and normally lying out of the path thereof, and just above the raised portions 280 of the control bar 278. When it is shifted, as just described, by the operation of the toggle lever, the cam 277 riding up upon the raised portion 280 of the bar 278 causes an elevation of the reduced end 276, which lifts the stepping dog out of one of the notches in the rack bar 76. The locking dog being normally held out of engagement with the rack bar has no effect in preventing movement of the carriage. So long as the skip lifter wire is held in elevated position by one of the raised portions 280, the carriage will continue to move forward under the action of the spring drum 85, but when the skip lifter wire drops into one of the notches 279 the stepping dog 83 is carried downwardly into the next notch of the bar 76 by the spring 268. If the next field on the card is desired to be skipped, the same operation will take place upon another depression of the November key. If, however, punching is resumed, the first actuation of one of the numeral keys will cause, as is readily understood, a projection of its corresponding interposer and an operation of the actuator 206. This will rock the universal bar 255 as before described and bring a finger 281 into engagement with an arm 282 opposite to the arm 271 on the toggle lever, and shift the pivotal point of its links beyond center in the opposite direction, withdrawing the skip lifter wire 82, so that the bar 278 will ride under the reduced end, as will be readily understood.

Sometimes, and particularly when an error has been committed in punching a card, it is desirable to remove the card at once and in order to do this I provide independent means for releasing the stepping dog 83 from the rack 76, so that the spring drum 85 can drive the carriage forward for its full movement, the card can be readily removed and the carriage then returned to receive a new card from the feed knives. The mechanism for accomplishing this result is well known in this art and is shown clearly in the Patent No. 1,426,223, granted to me on August 15, 1922, but which generally comprises a bell crank lever 283 and a button 284 for operating the same. This bell crank lever is pivoted to a bracket carried by the upper punch plunger plate and has the leg opposite that to which the button is secured projected through an opening in the lower punch plunger plate, where it is arranged to engage an upstanding end 286 formed on the cam slide 287. This cam slide is carried in a cam box 288 notched transversely as at 289 to receive the skip lifter wire 82. The cam slide is provided as shown with a cam surface 290, which when the slide is retracted by the depression of the button and of the lever, will ride up upon the forward end of the cam box, elevate the skip lifter wire and trip the engaging end of the stepping dog 83 out of engagement with the rack bar, thus permitting the spring drum to move the carriage to the front of the machine. The bell crank lever is returned to normal position by spring 291. The cam slide is returned to normal position by engagement of the arm 159 with its depending end 292.

Duplicating mechanism

In addition to the mechanisms "B" and "C", which have been previously described, I provide mechanism "D" adapted when placed in operation to reproduce on subsequent cards being punched certain or all of the data contained on cards previously punched. Frequently, it is desirable to duplicate only certain of the data on previously punched cards and the mechanism, which will now be described and has generally been indicated by the letter "D", is so constructed that the data either partial or complete upon previously punched cards may be reproduced on other cards. Provision is also made whereby the duplicating mechanism may be rendered inactive, while certain desired original data is punched in the card then being operated upon. The duplicating mechanism will now be described as follows.

Mounted upon bracket arms 293, extending laterally from the frame-work 118, is a card receiving table 162, over which the arms 160 and 161 of the card supporting carriage are adapted to move. The table 162 is slotted throughout its length, as indicated at 295, to receive and guide the adjustable foot piece 296 of the rear arm 160 and the weighted dressing foot 297 of the forward arm 161. At each side, the table is provided with upstanding flanges 298 and 299, each of which toward the rear of the table has an overhanging portion 300, serving to hold the marginal edges of the card down on the table. The forward edges of these overhanging portions are preferably upwardly inclined, so as to insure proper engagement of the pattern card therebeneath when the same is placed in the machine.

As shown in the drawings, the adjusting foot 296 is secured to the underside of the arm 160 and has its card engaging face seated in a recess defined by forwardly projecting fingers 301, which when the card is in engagement with the adjusting foot 296 overhang the rear marginal edge thereof and prevent the same from lifting or buckling in the center. The arm 161 carries an upstanding bracket 302 having fulcrumed on its upper marginal edge a bell crank lever 303, whose forward card engaging end depends slightly into the slot 295. Its opposite leg is weighted, as shown, or may be drawn downwardly by a spring, if found desirable. The weight or light spring, whichever is employed, is sufficient to bring the depending leg of bell crank lever 303 (Fig. 2) against the card and hold the same depressed back against adjustable end 296. Intermediate the length of the table and substantially opposite the punches, there is embedded therein a plurality of contact elements 304, all connected by means of the conductors 305 to their respective selector magnets through a selector switch $S^5$. Secured immediately above the contact elements is a casing 306 having arranged therein a plurality of spring depressed plungers 307, equal in number to the contact elements and, therefore, equal in number to the selector magnets and punches. Each of these plungers has its lower ends made in the form of a socket to receive a contact ball 308 and the contact elements 304 are slightly dished to receive said balls, whereby a more perfect contact can be made when an opening or perforation is encountered in the pattern card. The selector switch $S^5$, as will be readily understood from inspection of Fig. 33, is arranged to control the selector magnets, either through the operation of the numeral keys of the typewriter and the November and December keys thereof, or through the make and break of the contact elements on the duplicating table and in order to control this switch, so as to operate the selector magnets either through the typewriter keys or through the duplicating mechanism, I provide an automatically controlled magnetic switch throwing mechanism which is shown in Figs. 5 and 21. This mechanism comprises an electromagnet 309 mounted upon a suitable support, carried by the base. The magnet is here shown in the form of a solenoid having a core 310, which is pivotally connected at its outer end to a rock lever 311 secured to the shaft 312 of crescent shape switch bar 313. This switch bar is, as shown in Figs. 5 and 21, located directly beneath the respective sets 314 and 315 of the switch contacts, which respectively control the passage of current to the selector magnets from the keyboard of the typewriter and the duplicating mechanism.

The switch as shown is provided with two sets of thirteen contacts each, one for each selector magnet in each set and an additional ground contact or a return circuit contact, as illustrated at 316, 317, in Fig. 33. When the magnet 309 has been energized and the switch bar operated to connect all of the contacts 315 with the ground 317, the selector magnets will be operated through the duplicating mechanism. When the magnet has been deenergized, as shown in Fig. 5, and the latching mechanism to be hereafter described has been tripped, the contacts 314 will all be connected to the ground wire 316, so that the selector magnets will all be operated through the keyboard of the typewriter. As shown in Fig. 33, the circuit of the selector switch operating magnet 309 is controlled through three gaps or switches $S^6$, $S^7$, $S^8$, in addition to the switch $S'$ and the switch controlled by the actuation of the punch magnet. The switches S⁶ and S⁷ are normally open when the selector magnets are operated through the actuation of the typewriter keys. The switch S⁷ is held in open position by a foot piece 318 carried upon the card retaining flap 319, pivoted to the left hand flange 298 on the table 162 and held in open position normally by a spring 320. When this card retaining flap is thrown downwardly to the position shown in Fig. 1, the foot 318 releases the movable contact element of the switch S⁷, thus closing the circuit of the magnet 309 at this point. The card retaining flap is held in card retaining position by means of a manually releasable latch 319a as shown in Fig. 1.

The switch S' is also a normally open switch but is closed through mechanism controlled by the movement of the carriage as it is carried rearwardly to engage a new card which is being fed forward by the knives. This mechanism is clearly illustrated in Figs. 5 and 12 and is described as follows.

Pivoted to a bracket 321 is a bell crank lever 322, the vertical leg of which is guided in a slotted bracket 323 and lies in the path of the cam stop 324, adjustably mounted upon a graduated bar 325, secured to the carriage, as shown in Fig. 12. When the cam face 326 of the cam stop 324 engages the vertical leg of the lever 322, during the forward movement of the carriage, the horizontal end of the bell crank lever will be depressed. This horizontal end carries an arm 327, upon which is pivoted a switch actuating member 328, having a shoulder 329 engaging a piece of insulation on the end of the movable contact member 330 of the switch S⁶. The member 328 is provided with an insulating tongue 331 lying in the path of the rock lever 311, so that immediately the magnet 309 has been energized and the crescent shape bar rocked upon its shaft 312, the lever 311 will kick the shoulder 329 off of the movable contact member 330 which being then released will return to normal position separated from the stationary contact member 331a. Thus the circuit of the magnet 309 will be immediately broken after the same has been energized. In order to maintain the rock lever 311 in the position which it is thrown by magnet 309 after the circuit of this magnet has been broken and until automatic punching in that particular field has been finished I provide mechanism which incidentally holds member 328 out of engagement with contact element 330 and comprises a latching dog 332 pivoted to the horizontal arm of the bell crank 322 and normally having its free end depressed by a spring 333. Adjacent the free end of the dog 332 there is secured thereto an arm 334 which rests upon the upper face of the horizontal leg of the bell crank 322 and limits the downward movement of said dog. The free end of the dog is notched as shown at 335 and is arranged to engage over a stud 336 carried by the rock lever 311. The parts are retained in this position by reason of the engagement of the vertical leg of the bell crank 322 with a cam stop 324 until the carriage has moved forward a sufficient distance so that the cam 326 passes the vertical leg, at which time the bell crank lever will be returned to normal position under the influence of the spring 337. The elevation of the horizontal leg kicks the dog 332 off of the stud 336, at which time the core of the magnet will be drawn outwardly by the spring 338 and the shaft 312 rocked so that the contact member 313 will establish contact with the opposite set of contact springs. At this time, a spring 339 will act to return the member 328, so that the shoulder 329 engages over the insulation on the movable contact element 330 when the foregoing mechanism is ready for another operation.

In Fig. 12 I have shown two stops spaced apart the distance of one field on the card being punched, but it will be understood that I may use as many different stops as are found desirable in practice. Where a long stop is to be placed at the forward end of the carriage, as shown in Fig. 12, only one cam 326 is needed at the rear end of the stop. Where a short stop is employed, for instance where it is desired to duplicate one field only, a cam 326 is employed at each end so that after the operator has punched the original data in the vacant field the vertical leg of the bell crank will ride up on the forward cam of the stop and close the circuit of the magnet 309, which will then act to connect all of the contacts 315 of the selector switch with the ground contact 317. After the field controlled by the stop 324 has been duplicated in the card being punched the vertical leg of the bell crank 322 will ride off the rear cam of the stop and the trip mechanism shown in Fig. 5 and just described will operate to restore the parts for typewriter actuation.

To prevent control of the selector magnet circuits from the duplicator attachment when the pull rod is being drawn out to feed a card into punching position and to insure the pull rod being completely restored to home position before automatic duplicating commences, I provide the switch S⁸, which is controlled by the pull rod 135 through a bell crank 340 having one leg thereof engaged with the movable contact 341 of the switch S⁸. The opposite leg of the bell crank lever has pivoted thereto a dog 342 which is thrown into engagement with and rides upon the side of the pull rod 135 by a spring 343. Adjacent the forward end of the pull rod 135 is a notch 344, which receives the free end of the pawl having a cam surface as shown in Fig. 13. When the pull rod 135 is pulled outwardly to feed a card into punching position as heretofore described, and to return the carriage with the pattern card coupled up with the arms 160 and 161, the first eighth of an inch movement cams the dog 342 out of the notch and permits the spring contact 341 to separate itself from the contact 345 of the switch S⁸. When the pull rod is returned to its rearmost position, under the influence of the spring drum 133, the pawl will ride down the cam surface of the notch 344 and then being engaged by the shoulder of the notch will shift the bell crank so as to cause the contact 341 to engage the contact 345 and thus complete the circuit at this point. The switches S⁶ and S⁷ being closed, the selector switch magnet 309 will be energized and the contact element 313 rocked on its shaft so as to free the contacts 314 and connect up the contacts 315 with the ground 317. Then, if an opening or perforation in the card is beneath the contact elements of the duplicating mechanism, the proper selector magnet will be energized, which will in time complete the circuit of the punching magnet, punch a similar hole in the card being operated upon, the escapement for the carriage will also be actuated and the pattern card and the card being punched stepped along equal distances. This will continue so long as the stop 324 is in the path of the bell crank 322. When the bell crank rides off of the stop 324 the parts will be restored to the position shown in Fig. 5, as has been previously described, and the contacts 315 of the selector switch all connected to be controlled by the typewriter keys.

It sometimes is necessary to return the carriage to starting position without operating the pull rod or to move it rearwardly for a short distance, as in cases where a field has been accidentally skipped, which should have contained some original data. Under these circumstances, if the bell crank were resting upon a stop, punching would continue during the rearward movement of the carriage. In order that this may be avoided, I provide a special means for opening the switch S⁸ as the carriage is moved rearwardly. This mechanism comprises a rod 346 extending longitudinally of the table 117, which rod is carried upon arms 347 pivoted to the frame-work 118 and having depending therefrom a forked arm 348, engaging an insulating disk 349 interposed between said arm and a head 350 secured upon a rod 351 connected to the contact element 345 of switch S⁸. When this rod is rocked on a pivotal connection of the arm 347, the arm 348 acting upon the rod 351 will separate the contact element 345 from the contact element 341, which then is the stationary contact element being held immovable by the arm of the bell crank 340 which is connected thereto. To operate the rod 346, I provide a bell crank lever 352 pivoted at 353 to the card supporting carriage or more correctly speaking to the arm 158 of said carriage, which bell crank lever is provided with a forwardly projecting portion having a depending hand 354, which engages over the end of the rod 346, as shown in Fig. 5. The upper end of the bell crank lever is provided with a thumb piece 355 by which the same may be operated. I also provide a spring 356 for holding the bell crank against a stop 357, but these latter parts may be omitted, if desirable, as the tension of the spring 345 will be sufficient to return the parts to normal position when the bell crank lever is released.

It is sometimes desirable to lock the bell crank lever in position to close the contacts of the switch S⁸ and this is especially so where it is desired to duplicate the entire data on the pattern card. To accomplish this, I provide a bar 358 slidably mounted on headed studs 359. The rod is provided at its forward end with a finger piece 360 and at its rear end with a hook 361, adapted to engage over the vertical leg of the bell crank 322 and hold the same in the same position as though it were engaged by a stop 324. The hook 361 is provided with a cam surface 362, which cams the bell crank into working position, as will be readily understood.

In some cases it may be desirable to suppress the automatic action of the duplicator, and permit the punching of data in certain card fields under the control of the typewriter keys when such fields would be normally duplicated. For this purpose it is necessary that a special key on the typewriter be actuated and held down before such duplicating field is reached on the pattern card.

For this purpose I have shown, in Fig. 32, in addition to the space bar control switch, a switch S¹⁰ comprising stationary and movable contacts 363 and 364, the latter of which is moved by a key-operated plunger 365. As shown in Fig. 33, switch S¹⁰ is included in the circuit of the multiple switch solenoid, so that the operator may, at any time, before the operation of the machine to duplicate the punched record on the pattern card, open a gap in the circuit of the multiple switch solenoid to prevent its bringing into action the automatic duplicating mechanism.

In illustrating and describing the machine the construction, as will be noted, embodies sections or elements B, C and D, which have been associated together for the purpose of punching indicia in cards to be subsequently used for tabulatable statistics and I have described means whereby the element B, viz., the typewriter embodied in part a switch which, when opened, permits the operation of the typewriter entirely independent of the punching or duplicating mechanisms. I now wish it understood that the element B may be entirely dispensed with and the element C utilized by itself or with the element D and that D and C may be operated independently of the typewriter as an entity so that original cards may be punched from the keyboard of the punching mechanism to the exclusion of the typewriter and such cards used as pattern cards in the duplicating mechanism for subsequently reproducing such punched data or indicia in other cards.

When the machine is operated independently of the typewriter the levers 201 are provided with numeral buttons which upon being depressed operate the plungers 202 and actuate the interposers as has been previously described to close the switch $S^{11}$ and throw the selected interposer in the path of the punch actuator. The closing of the switch $S^{11}$ completes the circuit of the punch magnet 221 as follows: from the plus side of the line over the wires $a, e, f$, magnet 221, switch $S^{11}$ and back to the opposite side of the line over the wire $g$. The magnet 221 being energized pulls up on its armature and operates the punch actuator, as will be readily understood from the foregoing description.

When the elements C and D are utilized for automatic duplication of the indicia carried by the pattern card the selector switch has the circuit of its solenoid 309 closed as follows: from the plus side of the line over the wire $a$, resistance $a^1$, wire $a^2$, switches $S^6$, $S^7$, $S^{10}$, wire $h$, magnet 309, and back to the other side of line through switch $S^8$, the switch $S^6$ being closed at this time through the full retraction of the card feed pull rod, and the switch $S^7$ being closed by reason of the fact that the card gate or card retaining flap 319 is then in its closed position held by the latch 319a. It is of course understood that the switch $S^{10}$, illustrated in Fig. 32, and controlled by the plunger 365, is a normally closed switch and is only opened when it is desired to eliminate the automatic duplication of any particular field in the card being punched.

As has been previously described the switch $S^6$ is not only controlled through the instrumentality of the pull rod 130, but is also controlled through the operation of the lever 352 so that the carriage may be shifted back and forth without actuating the selector magnets when such action is desirable.

When the punches are operated from the typewriter and any one of certain of the keys on the typewriter is depressed a switch 15 is closed and circuits are established as follows: from the plus side of line over the wire $a$, resistance $a'$, wire $a^2$, switch $S^2$, wire $a^3$, switch S, the selected switch 15, wire $b$, conductor 20 to the selector magnet 21, conductor $c$, wire $d$, to the proper terminal of the selector switch to the ground contact 316, wire $d'$, switches $S^1$, $S^8$, back to the other side of line. A circuit is also completed when the switch $S^{11}$ is closed by reason of the movement of one of the interposers as follows: from plus side of line over wires $a$ and $e$, magnet M, wire $f$, magnet 221, switch $S^{11}$ and back to the opposite side of line over wire $g$. This completes the circuit of the punch magnet and the slow acting magnet which, as before described, operates a short time after the operation of the punch magnet 221 so as to interrupt the circuit through the switch S to the selector magnets and prevent the possibility of overheating and to prevent repetition punching if the typewriter key be held down. If the switch $S^8$ is opened by reason of the pull rod being held away from its position of rest for any reason whatsoever the circuits of the selector magnets will be broken and no operation of the punching mechanism will take place, the operator then noting that something is wrong with the machine cures the defect or removes the obstacle in the path of the pull rod permitting its full retraction and the automatic closing of the switch $S^8$ whereupon the circuit will be completed as before and the selector magnet operated to close the switch $S^{11}$, and the circuit of the punching magnet 221.

If in automatic punching a plurality of stops 324 are used so as to automatically punch certain fields and permit other fields to be hand-punched, either through the operation of the typewriter keys or through the manipulation of the punch levers, as will be readily understood, the switch $S^6$ will remain closed just so long as the bell crank 322 is engaged with the stop. When the bell crank rides off of the cam end 326 of a stop the dog 332 will release the solenoid 310 of the magnet 309 and permit the spring 338 to shift the crescent shaped contact bar of the selector switch from the contacts 315 and the ground contact 317 to engagement with the contacts 314 and ground 316, thus permitting operation of the selector magnets through the typewriter keys for punching original data in the field not controlled by the stops. If a second stop is encountered the bell crank rides up upon the stop and automatically closes the switch $S^6$ so that the magnet 309 gets current from the positive side of line over wire $a$, resistance $a'$, wire $a^2$, switches $S^6$, $S^7$, $S^{10}$, wire $h$, magnet 309 and back to the opposite side of line through switch $S^8$ which is then closed. The magnet 309 being energized pulls up on its core and shifts the bar of the selector switch to the contacts 315 and ground 317 whereupon current passes through the selector magnets as follows: from the positive side of line over wire $a$, resistance $a'$, wire $a^2$, ground wire of contact 317, contact bar of the selector switch through the particular contact and over one of the wires $c^2$ to the conductors 20, selector magnets 21, wires $d$, card controlled contacts 304, 308, wires $c'$, ground contact 316, wire $d'$ and switches $S'$ and $S^8$, back to the other side of line.

It will be understood that I may employ as many stops as is found desirable for controlling the automatic punching of certain fields of the card being operated upon or I may use a single stop for controlling a great number of fields arranged adjacent to one another, or if desirable, by operating the lock bar 358 the entire pattern card may be automatically duplicated.

Provision is made in the present machine for permitting the actuation of the ordinary typewriter space key to space the typewriter without effecting the operation or spacing of the punching mechanism and provision is also made whereby the typewriter and punch may be spaced together. Referring to Figs. 1, 22 and 32, 14 is the usual typewriter space bar and the part designated 366 is a bent plate forming a finger piece overlying the right hand end of space bar 14 but independent thereof and free from any fastening thereto. If the operator desires to space the punching and the typewriter together, he depresses part 366 and thereby effects a depression of the typewriter space bar 14. If, on the other hand, it be desired to space the typewriter without spacing the punch the typewriter space bar 14 alone is depressed and part 366 remains in normal upper position.

Referring to Figs. 32 and 22 it will be seen that part 366 is connected to an arm 367 and resiliently rocked counterclockwise by a spring 369. Upon the depression of member 366 a member 368 is operated and this closes the switch 15 under the typewriter nought key and punches a hole in the nought position in the card. This is the common and usual way of spacing the punch inasmuch as where a column is skipped it is the customary practice to punch a nought.

What I claim is:—

1. In combination in a punching machine, card punching mechanism, card feeding mechanism, means for directly receiving a card from said feeding mechanism and for carrying and moving said card completely through the punching mechanism for a punching operation thereon, and means for advancing said carrying and moving means toward the card to receive the same as it is fed into punching position by the feeding means.

2. In combination in a punching machine, a punching mechanism card feeding mechanism, card receiving and advancing mechanism for directly receiving a card from said feeding mechanism and carrying and advancing it intermittently through the punching mechanism for a punching operation, and means for moving said receiving and advancing mechanism and said feeding mechanism in opposite directions to bring a card into said card receiving mechanism at each opposite movement of both mechanisms.

3. In combination in a punching machine, punching mechanism card feeding mechanism, mechanism for receiving a card from said feeding mechanism and advancing the card completely through the punching mechanism for a punching operation, means for simultaneously feeding the card and causing the advancing mechanism to move into engagement with the card and mechanism for subsequently advancing the card while carried in the aforesaid receiving and advancing mechanism through the punching operation.

4. In combination in a punching machine, card feeding mechanism, a punching mechanism, mechanism for advancing the card through the punching mechanism for a punching operation, means for simultaneously feeding the card and causing the advancing mechanism to move into engagement with the card and key-controlled mechanism for subsequently advancing the card through the punching operation.

5. In combination in a punching machine, including punches, mechanism for feeding a card beneath said punches for intermittent punching operations, means for advancing a card in the same direction as it is fed by the feeding mechanism and means for causing said latter mechanism to move into card engaging position in opposition to the movement of the card caused by the feeding mechanism.

6. In combination in a punching machine, a card magazine, a card carriage for advancing the card and carrying it completely through the punching mechanism, a card feeding device for feeding the card from the magazine and delivering it directly to the card carriage and means for simultaneously moving the advancing mechanism and card feeding device in opposite directions to coordinate the feeding and advancing operations of the two.

7. In combination in a punching machine, a card carriage for advancing the card and carrying it completely through the punching mechanism, a card feeding device and means for simultaneously moving the advancing mechanism together with means for returning the card feeding mechanism to normal position.

8. In combination in a punching machine, a manually actuated card feeding device for feeding a card in rectilinear path, a key-controlled mechanism which receives the card from the aforesaid device for advancing the card through the punching operation and means for returning the card feeding device to normal position without affecting the card advancing mechanism.

9. In combination in a punching machine including punches, a reciprocating card feeding device manually actuated to feed a card rectilinearly into punching position and automatically returned when released and a card advancing mechanism operable upon the manual actuation of the card feeding device to move in the direction opposite to the aforesaid rectilinear movement of the card and into card engaging position when the card is moved beneath the punches.

10. In combination in a punching machine including punches, a card feeding device manually actuated to feed a card beneath the punches, a card carriage supplemental to the aforesaid feeding device and receiving a card therefrom, means for moving the card carriage into engagement with the card and means for subsequently advancing the card in a plane forming a continuation of the feed by the first mentioned device.

11. In combination in a card punching machine including punches, a reciprocable card feeding device movable to feed a card rectilinearly beneath said punches and mechanism receiving the card from the aforesaid device for continuing the movement of said card beneath the punches step by step.

12. In combination in a card punching machine including punches, mechanism to feed the card forwardly beneath the punches and mechanisms subsequently acting independently of the first mentioned mechanism to continue the movement of the card in the same plane to a plurality of punching positions.

13. In combination in a card punching machine including punches, means for feeding a card rectilinearly into initial punching position, means actuated in the operation of the card feeding device for engaging behind the card after it is fed to its initial punching position by the aforesaid means and key-controlled mechanism for subsequently advancing the card beneath the punches in the plane of feed.

14. In combination in a punching machine, a card table, a card feeding device for moving a card a predetermined distance over said table, a carriage receiving the card from the aforesaid device for continuing the movement of the card over said table for intermittent punching operations, and key-controlled mechanism for actuating said carriage.

15. In combination in a punching machine, a reciprocating card feeding device for moving a card in a rectilinear path, a reciprocating card carriage receiving a card therefrom and also adapted to feed a card in a rectilinear path, manually controlled means for moving the feeding device in one direction, means actuated thereby for moving the carriage in the opposite direction whereby the carriage advances to meet the card and key-controlled mechanism for subsequently moving the carriage in the direction of feed to continue the advance of the card beneath the punches.

16. In combination in a punching machine, a reciprocating card feeding device, a reciprocating card carriage, manually controlled means for moving the feeding device in one direction, means actuated thereby for moving the carriage in the opposite direction whereby the carriage advances to meet the card and key-controlled mechanism for subsequently moving the carriage in the direction of feed to continue the advance of the card beneath the punches, together with means for automatically returning the card feeding device to normal position when released.

17. In combination in a card punching machine, a card feeding device manually actuated to feed a card into punching position beneath the punches, a card carriage, means including a clutch for causing the card carriage to move in a retrograde direction for engagement with the card when fed to its punching position, said clutch acting to release the carriage moving mechanism, and means for returning the card feeding device to normal position.

18. In combination in a card punching machine, a card feeding device manually actuated to feed a card into initial position beneath the punches, a card carriage, means including a clutch for causing the card carriage to move in a retrograde direction for engagement with the card when fed to its initial position, said clutch acting to release the carriage moving mechanism, so that the card feeding device can be returned to normal and means for subsequently causing the card carriage to advance the card in the direction of feed beneath the punches.

19. In combination in a punching machine, a card feeding device manually actuatable to feed a card into initial punching position and automatically return to normal position, key-controlled mechanism automatically acting to advance the card and to actuate the punches and means for preventing the operation of the advancing mechanism and the punches until the card feeding device has been returned to normal position.

20. In combination in a card punching machine including electrically actuated punches, a card feeding device manually actuated to feed a card into initial punching position, a card carriage receiving the card fed by the aforesaid device and having provisions for subsequently carrying the card during punching operations, key-actuated mechanism controlling the operation of the punches, and means actuated by the card feeding device for controlling the operation of the key-actuated means to prevent punching when said device is in improper position.

21. In a punching machine, means for feeding a card into punching position, a card carriage receiving a card from the aforesaid card feeding means and mechanism for moving the same, adapted to move the card beneath the punches, means operated by the card feeding means for moving the carriage into card engaging position and means permitting movement of the carriage in either direction independent of the card feeding means.

22. In combination with a card punching machine including electrically actuated punches, a card feeding device for feeding a card into initial punching position, a carriage receiving said card when in said position and having provisions for thereafter advancing the card through successive punching positions, key-controlled mechanism for operating the punches, and a switch actuated by the card feeding device for controlling the operation of the punches.

23. In a card punching machine, the combination with card punching mechanism, of means for advancing a pattern card and a card to be punched simultaneously from field to field of each card, whereby the fields of both are maintained aligned transversely during the feed and mechanism controlled by the indicia in the pattern card for actuating the punching mechanism to duplicate in corresponding fields of the card being punched the indicia of the pattern card.

24. In a card punching machine, the combination with card punching mechanism, of means for advancing a pattern card and a card to be punched simultaneously from field to field of each card, whereby the fields of both are maintained aligned transversely during the feed, mechanism controlled by the indicia in the pattern card for actuating the punching mechanism to duplicate in corresponding fields of the card being punched the indicia of the pattern card and means controlled by the operator for determining the indicia to be duplicated.

25. In a card punching machine electrically actuated punches, individual key-controlled mechanism for selecting each of said punches, common actuating mechanism operating upon actuation of a key to automatically operate the punch selected, and means controlled by a pattern card for operating the foregoing mechanism independent of the keys.

26. In a card punching machine electrically actuated punches, individual key-controlled mechanism for selecting each of said punches, common actuating mechanism operating upon actuation of a key to automatically operate the punch selected, and mechanism controlled by the indicia on a pattern card for sequentially actuating the foregoing mechanism and simultaneously advancing the pattern card and the card being punched.

27. In a punching machine, individual electrically actuated punch selecting mechanisms and a common punch operating mechanism, contact elements controlled by the indicia in a pattern card, connections between said contact elments and the selecting and punching mechanism for automatically reproducing certain indicia of the pattern card in the card being punched, means for causing simultaneous and synchronous increments of movement in the pattern card and card being punched, and means for operating the punches independently of the pattern card.

28. In a card punching machine, individual electrically operated punch selecting mechanism and a common punch operating mechanism, means for feeding a pattern card, means controlled by the pattern card for duplicating the indicia thereon in the card being punched, means for rendering inoperative the mechanism controlled by the pattern card and independent means controlling the operation of the punches when not under control of the pattern card.

29. In combination in a card punching machine, a card feeding device, a card moving carriage, means for actuating the card feeding device to feed a card into punching position, means controlled by said actuating means for feeding the carriage into position to engage the card from the card feeding device, and manual means for disconnecting the card feeding device and the carriage at any point of their travel.

30. In a card punching machine, electrically operated punch selecting and actuating mechanisms, contact members connected to said mechanisms, and means for feeding a pattern card beneath said contact members and for causing a simultaneous and equal movement of the card being punched, said means operating a plurality of times during the duplicating action upon one card.

31. In a card punching machine, electrically actuated punch selecting and operating mechanisms, means acting to cause a sequential operation of said mechanisms automatically, means controlled by the indicia on a pattern card for determining the punch or punches selected and operated, means operated in the operation of a punch for shifting both the pattern card and the card being punched and adjustable means for determining the effectiveness of the indicia in the pattern card in controlling the operation of the selecting and punching mechanism.

32. In a card punching machine, the combination with electrically operated punch selecting and operating mechanisms, means causing a sequential operation of said mechanisms, electrical contact elements, connections from the contact elements to the punching selector mechanism, means controlled in the operation of the punching mechanism for feeding a card to be punched beneath the punches and a pattern card between the contact elements and adjustable means for interrupting the circuit of the connections controlled by the contact elements.

33. In a card punching machine, the combination with electrically operated punch selecting and punch operating mechanisms, means controlled by a pattern card for controlling the operation of the selecting mechanism, means for simultaneously and equally moving the pattern card and the card being punched and an escapement actuated by the punching mechanism for controlling the operation of the moving means.

34. In a card punching machine, the combination with electrically actuated punch selecting and punch operating mechanisms, a table over which the card being punched moves, a table over which a pattern card moves, means to produce simultaneous and similar increments of movement in the pattern card and the card being punched, means controlled by the pattern card for controlling the punch selecting mechanism, means for retaining the pattern card in position upon its table and means actuated by said retaining means when in inoperative position for rendering inoperative the means controlled by the pattern card.

35. In a punching machine, the combination with a typewriter, electrically operated punch selecting and punch operating mechanism, including selector magnets, circuit connections from the typewriter to said magnets which are controlled by the operation of certain of the keys of the typewriter and means, operating to interrupt said circuit upon the operation of the punching mechanism.

36. In a punching machine, the combination with a typewriter, electrically operated punch selecting and punch operating mechanisms, connections between the typewriter and said mechanisms controlled by the operation of certain keys of the typewriter and means acting immediately subsequent to the operation of the punch mechanism to interrupt the connections.

37. In a punching machine, the combination with a typewriter of electrically actuated punch selecting and punch operating mechanisms, connections controlled in the operation of certain of the typewriter keys for controlling the operation of the selector mechanism, means operated in the movement of the selector mechanism, and means included in said connection and operating subsequent to the operation of the punching mechanism for interrupting said connection.

38. In a punching machine, the combination with a typewriter of electrically actuated punch selecting and punch operating mechanisms, connections controlled in the operation of certain of the typewriter keys for controlling the operation of the selector mechanism, means operated in the movement of the selector mechanism for controlling the operation of the punching mechanism, and a slow acting magnet in circuit with said punching mechanism for interrupting said connections after the operation of the punching mechanism.

39. In a punching machine, the combination with a typewriter, electrically operated punch selecting mechanism, punch operating mechanism including an electrical magnet, electrical connections to said selector mechanism and said punch magnet controlled by the operation of certain of the keys of the typewriter, a slow acting magnet in said connection and means operated by the slow acting magnet for interrupting said connections after the operation of the punch magnet.

40. In a punching machine, the combination with a typewriter of electrically operated punch selecting and punch operating mechanisms controlled by certain of the keys of the typewriter, means acting to interrupt said connections immediately after the operation of the punching mechanism and means actuated by the punching mechanism for interrupting the connection to the selector mechanism.

41. In a card punching machine, the combination with a typewriter of electrically operated punch selecting and punch operating mechanisms, electrical connections to said mechanisms controlled by certain of the keys of the typewriter, a circuit breaker in the connection with the punching mechanism, said circuit breaker acting subsequent to the operation of the punching mechanism to interrupt the connections to the selector mechanism and means operated by the punching mechanism for opening the connections to the selector mechanism, said means acting to hold said connections open until the punching mechanism is restored to inoperative position.

42. In a punching machine, the combination with a typewriter, punch selecting mechanism including a plurality of magnets, punch operating mechanism including an electro-magnet, electric circuit connections from said typewriter to said punch selecting and punch operating mechanisms, a circuit breaker in circuit with the punch magnet and arranged to open the circuits of the selector magnets after the operation of the punch magnet and means controlled in the operation of the punch magnet for also interrupting the circuit of the selector magnets, said latter means acting to hold the selector magnet circuits open until the punching mechanism is restored to inoperative position.

43. In a punching machine, the combination with a typewriter, of electrically operated punch selecting mechanism including selector magnets, punch operating mechanism including an electro-magnet circuit, connections between said typewriter and said mechanisms, a switch operated by certain of the keys of the typewriter for closing said connections and a slow acting magnet in circuit with a punch magnet adapted when actuated to open said switch after the operation of the punch magnet.

44. In a punching machine, the combination with a typewriter of electrically operated punch selecting mechanism, including selector magnets, punch operating mechanism including an electro-magnet circuit, connections between said typewriter and said mechanisms, a switch operated by certain of the keys of the typewriter for closing said connections, a slow acting magnet in circuit with a punch magnet adapted when actuated to open said switch after the operation of the punch magnet, and mechanism actuated in the operation of the punch magnet for opening the circuit of the selector magnets and holding the same open until the punching magnet is restored to its position of rest.

45. In a punching machine, the combination with a typewriter of electrically operated punch selecting mechanism, including selector magnets, punch operating mechanism including an electro-magnet circuit, connections between said typewriter and said mechanisms, a switch operated by certain of the keys of the typewriter for closing said connections, a slow acting magnet in circuit with a punch magnet adapted when actuated to open said switch after the operation of the punch magnet, a second switch controlling the circuits of the selector magnets and mechanism actuated by the punching magnet for opening said switch and holding the same open until the punch magnet is restored to normal position.

46. In combination in a card punching machine a punching mechanism, a card feeding device to feed a card in a rectilinear path, a carriage for advancing the card through the punching mechanism for a punching operation, means controlled in the operation of the card feeding device in rectilinearly advancing a card for returning the carriage to meet the card and supplemental means for slightly advancing the card after the carriage has been returned to its full retrograde position.

47. In a card punching machine a punching mechanism, a card feeding device for rectilinearly feeding a card before a punching operation thereon, a carriage for advancing the card through the punching mechanism for a punching operation, means actuated in the operation of the card feeding device for returning the carriage to meet the card which has been rectilinearly fed forward by the aforesaid feeding device and means for assuring a proper advance of the card to be engaged by the carriage.

48. In a card punching machine a punching mechanism, a card feeding device for rectilinearly feeding a card before a punching operation thereon, a card carriage for advancing the card through the punching mechanism for a punching operation, means operated in the actuation of the card feeding device for returning the carriage to meet the card which has been rectilinearly fed forward by the aforesaid feeding device and means for continuing the feed of the card slightly after the feeding device is in its full forward position.

49. In a card punching machine a punching mechanism, a card feeding device, a card carriage for advancing the card through the punching mechanism for a punching operation, means operated in the actuation of the card feeding device for returning the carriage to meet the card and a spring actuated device for slightly advancing the card after the card carriage has reached its extreme position.

50. In a card punching machine a punching mechanism, a card feeding device for rectilinearly feeding a card, a card carriage constructed to carry the card through the punching mechanism for a punching operation, means actuated in the operation of the card feeding device for returning the carriage to meet the card as the same is fed rectilinearly forwardly into punching position, means on the carriage for engaging behind the rear edge of the card and an auxiliary feed actuating to insure engagement of the engaging device.

51. In a card punching machine a punching mechanism, a card feeding device, a card carriage arranged to move the card through the punching mechanism for a punching operation, means operated in the actuation of the feeding device to return the carriage to meet the card, as it is fed forward into punching position, a gravity dog on the carriage for engaging the rear edge of the card and auxiliary feeding mechanism for insuring engagement of the dog after the carriage device is in full rearward position.

52. In a card punching machine, electrically operated punch selecting mechanism, electrically operated punching mechanism, means controlled in the operation of the selecting mechanism for subsequently actuating the punching mechanism and means actuated by the punching mechanism for rendering inoperative the selecting mechanism until the punching mechanism has been restored to normal.

53. In a card punching machine, electrically operated punch selecting mechanism, including magnets, electrically operated punching mechanism, means operated in the actuation of the selecting mechanism for controlling the operation of the punching mechanism and means operated by the punching mechanism for rendering inoperative the selected magnet of the selecting mechanism until the punching mechanism has been restored to normal.

54. In a card punching machine, electrically actuated punch selecting mechanism, electrically actuated punch operating mechanism controlled by said selecting mechanism, circuits for said selecting mechanism including magnets and means actuated upon the operation of the punching mechanism for interrupting the circuit of the particular magnets.

55. In a card punching machine, the combination with electrically operated punch selecting and punch operating mechanisms, key-operated mechanism connected to control said selecting mechanism, a pattern card controlled mechanism for operating said punch selector mechanism and selective means for determining the operation of the punch selector mechanism by the keys or the pattern card.

56. In a card punching machine, electrically operated punch selecting and punch operating mechanisms, key-controlled circuits connected to said punch selecting mechanism, pattern card control circuits connected to said selecting mechanism and selective means for determining the operation of the punch selecting mechanism by the keys or the pattern card.

57. In a card punching machine, electrically operated punch selecting and independent electrical punch operating mechanisms, key-controlled circuits for operating said punch selecting mechanism and pattern card controlled mechanism for actuating the selector mechanism independent of the keys, together with means controlled by the selector mechanism for initiating the actuation of the punch mechanism.

58. In a card punching machine, electrically operated punch selecting and independent electrical punch operating mechanisms, key-controlled circuits for operating said punch selecting mechanism, pattern card controlled mechanism for actuating the selector mechanism independent of the keys, means controlled in the operation of the punching for opening the circuits in the selector mechanism, and means brought into operation upon the operation of the selecting mechanism for initiating the electrical operation of the punch operating mechanism.

59. In a card punching machine, electrically operated punch selecting and punch operating mechanisms, key-controlled circuits for operating said punch selecting mechanism, pattern card controlled mechanism for actuating the selector mechanism independent of the keys, means actuated in the operation of the punching mechanism for holding open the circuits of the selector mechanism until the punching mechanism has been restored to normal, and means controlled by the operation of the selector mechanism for calling into action the punch operating mechanism.

60. In a card punching machine, electrically operated punch selecting mechanism, independent electrically operated punch operating mechanism, key-controlled circuits connected to said punch selecting mechanism, pattern card controlled circuits connected to said selecting mechanism, means in circuit with the punch selector mechanism for controlling the circuits and automatic mechanism determining the position of said last named means.

61. In a card punching machine, electrically operated punch selecting and punch operating mechanisms, key-controlled circuits connecting to said selecting mechanism, pattern card control circuits connected to said selecting mechanism, a multiple switch connected in said circuits for controlling the operation of the selector mechanism by the keys or by the pattern card and means for automatically determining the position of said switch.

62. In a card punching machine, key-controlled punch selector mechanism, a pattern card controlled mechanism for also operating said punching selector mechanism, circuits connecting the keys and the pattern card mechanism to the selector mechanism and including a multiple switch for controlling the operation of the selector mechanism by the keys or the pattern card, automatic means for determining the position of the switch and independent manually controlled means for determining the position of the switch.

63. In a card punching machine, electrically operated punch selecting mechanism, key or pattern card controlled circuits for said punch selecting mechanism, said circuits including a multiple switch shiftable to determine the operation of the punch selecting mechanism by the pattern card or the keys and means determined by the operator and thereafter automatically actuated for positioning the switch.

64. In a card punching machine, the combination with a typewriter, card punching mechanism, an escapement controlled mechanism for advancing the card through the punching mechanism for a punching operation and means simultaneously operating the escapement mechanism and a space bar of the typewriter.

65. In a card punching machine a punching mechanism, the combination with a typewriter, of escapement controlled card advancing means for moving the card through the punching mechanism for a punching operation, means for spacing the carriage of the typewriter and means mechanically cooperating with the typewriter carriage spacing means adapted to actuate the escapement and simultaneously control the spacing of the typewriter carriage.

66. In a card punching machine, means for automatically advancing the card as it is punched, including tabulating mechanism, a typewriter having tabulating mechanism, means actuated by certain of the keys of the typewriter for controlling the punching mechanism and means including selectively manipulable devices for independently or simultaneously causing the tabular advance of the card and the typewriter carriage.

67. In a card punching machine, the combination with a typewriter having a tabular escapement of punching mechanism having a tabular escapement, means controlled by the said tabular escapement of the punching machine for controlling the advance of the card being punched and means for simultaneously actuating the tabular escapement of the punching mechanism and the typewriter.

68. In a card punching machine, the combination with a typewriter of punch selecting mechanism, means controlled in the actuation of certain keys of the typewriter for operating said punch selecting mechanism, means actuated by the punch selector mechanism upon its operation for operating the punches and means independent of the typewriter for causing the actuation of the punches.

69. In a card punching machine, electrically operated punches, means controlled by a pattern card for controlling the actuation of said punches, means for feeding a card into punching position and automatically placing the pattern card with its fields aligned with the card to be punched and means operated in the return of the card feeding means to normal position for completing the circuits between the pattern card controlled means and the punching mechanism.

70. In a card punching machine, the combination with a plurality of punches, of means for feeding a card into punching position, mechanism controlled by a movable pattern card for actuating the punches and including circuits, means actuated by the card feeding means for interrupting said circuits while the card is being fed into punching position and for restoring said circuits upon the return of the card feeding means.

71. In a punching machine the combination with electrically actuated punches, means for feeding a card into punching position, means operated by the card feeding means for moving a pattern card in opposition to the feed and to cause alignments of the fields in the pattern card and the card being punched, means to move the pattern card and the card being punched, equal increments of movements, means controlled by the pattern card for actuating the punches and including circuits, and mechanical means for completing said circuits.

72. In combination electrically operated card punches including circuit connections therefor, a movable pattern card controlled mechanism for operating said punches, means for feeding a card into punching position and means actuated by the feeding means for controlling said circuits.

73. In a card punching machine, electrically operated punch selecting and punch operating mechanisms, key-controlled circuits for controlling said selecting mechanism, a pattern card controlled device for also controlling said selecting mechanism, circuits between said keys and said pattern card controlled device and said selector mechanism including a multiple switch, magnetic means for actuating said switch and means acting to simultaneously lock said actuating means in actuated position and to break the circuit of the magnet.

74. In a card punching machine, electrically operated punch selecting and punch operating mechanisms, key-controlled circuits for controlling said selecting mechanism, a pattern card controlled device for also controlling said selecting mechanism, circuits between said keys and said pattern card controlled device and said selector mechanism including a multiple switch, magnetic means for actuating said switch, means acting to simultaneously lock said actuating means in actuated position and to break the circuit of the magnet and means for releasing the latching means at a predetermined time in the operation of the punching mechanism.

75. In combination a typewriter key-controlled punch selecting mechanism, punches actuated thereby, a pattern card controlled mechanism, also adapted to control the selecting mechanism, circuits connecting said keys and said pattern card control mechanism with said punch selecting mechanism and including a multiple switch, magnetic means for throwing the multiple switch to connect the selector mechanism with the pattern card control mechanism and automatic means for throwing the switch to connect the selector mechanism with the typewriter.

76. In combination a typewriter key-controlled punch selecting mechanism, punches actuated thereby, a pattern card controlled mechanism also adapted to control the selecting mechanism, circuits connecting said keys and said pattern card control mechanism with said punch selecting mechanism and including a multiple switch, magnetic means for throwing the multiple switch to connect the selector mechanism with the pattern card control mechanism, an index bar and means carried thereby for controlling the opening and closing of the magnet circuit.

77. In a typewriter key controlled punching machine, punching mechanism, means controlled by the printing keys of the typewriter for operating said punching mechanism and feeding a card beneath the punches and mechanism controlled by a printing key at the typewriter for causing a predetermined movement of the card feeding means without operating the punching mechanism.

78. In a typewriter key-controlled punching machine, the combination with punching mechanism, means for feeding a card beneath the punches thereof, tabulator mechanism controlled from the typewriter for causing tabular movement of the card feeding means and selective means for causing the typewriter carriage to move in unison with or independently of the card feeding mechanism.

79. In a typewriter key-controlled punching machine, the combination with punching mechanism, means for feeding a card beneath the punches thereof, tabulator mechanism controlled from the typewriter including tabulator plates intermediate the typewriter and the card feeding means, stops on the card feeding means and means at the typewriter for controlling the movement of the tabulator blades.

80. In a card punching machine having a punch and die structure, a table over which the card moves in being punched, means engaging over the card for maintaining the marginal edge of the card upon the table, and means supplemental to the die structure itself for preventing buckling of the card upon its entrance into the punch and die structure.

81. In a punching machine, the combination with a card supporting table, means for moving a card thereover beneath the punches, means engaging over the marginal edges of the card for retaining it upon the table and a presser foot or finger engaging the center of the card to prevent buckling as it is fed beneath the punches.

82. In a punching machine, a card supporting table, means for moving in uninterrupted sequence a series of individual cards thereover beneath the punches and means engaging the marginal edges of a card for holding an individual card on the table, a portion of said means being removable to facilitate the removal of a damaged card.

83. In a punching machine, a card supporting table, means for feeding in uninterrupted sequence a series of individual cards thereover and a card guide plate removable at will by the operator for facilitating the removal of a card damaged in feeding or punching.

84. In a card punching machine, a card supporting table, a card carriage for moving the card over the table beneath the punches and throughout intermittent punching operations, a card hopper constituting a continuation of the table and means for feeding a card in a rectilinear path from the hopper over the table into position to be engaged by the card supporting carriage.

85. In a card punching machine, a punching mechanism, a card receiving hopper, card feeding knives arranged to feed a card from the hopper into punching position, a card carriage for moving the card through the punching mechanism for a punching operation and means for holding the card down on the knives as the rear end passes from the card hopper into position to be engaged by the carriage.

86. In a card punching machine, the combination with a card hopper, means for feeding a card from the hopper into punching position, a spring motor and a flexible connection between said motor and the card feeding means for returning the latter to inactive position.

87. In a card punching machine, the combination with a card hopper, means for feeding a card from the hopper into punching position, a spring motor, a flexible connection between the motor and feeding means, and a yielding connection between the flexible member and the feeding means for arresting the return movement of the motor without shock.

88. In a card punching machine, a card hopper, feeding knives, means for actuating the feeding knives to feed a card out of the hopper into punching position and cushioned means for stopping the travel of the feed knives in either direction.

89. In a card punching machine, the combination with a die, a plurality of punches and a stripper plate therefor, means for feeding a card between the die and the stripper plate and a card guiding device preventing buckling of the center of the card as it is fed between the die and the stripper plate.

90. In a punching machine, the combination with a card receiving table, of a die plate located in the table, punches arranged above the die plate, means for feeding a card between the die plate and punches, retaining members for holding the marginal edges of the card down upon the table as it enters between the punches and die plate and a card guide for preventing buckling of the center of the card as it enters the die.

91. In a punching machine, the combination with card feeding means of a card carriage, means actuated in the operation of the card feeding means for moving the carriage to meet the card and manual means for disconnecting the card feeding carriage at any point of its movement.

92. In a machine of the character described, a plurality of punches and a card carriage comprising arms engageable with opposite ends of the card, a table over which the card is moved by said carriage and means carried by the forward arm of the carriage for holding the card upon the table during its movement thereover.

93. In a machine of the character described, a plurality of punches and a card carriage comprising arms engageable with opposite ends of the card and adapted to move the card to and from a punching position, a table over which the card is moved by said carriage, a holding means carried by one of said arms, and means for throwing said holding means to inoperative position so as to facilitate the removal of the card from the table after it has been punched, 94. In a duplicating punch, duplicating mechanism including a card carriage for feeding pattern cards, a card engaging arm at one end of the carriage, a card engaging arm at the opposite end and a weighted card presser for holding the pattern card against the opposite arm.

95. In a duplicating punch, duplicating mechanism including a card carriage for feeding a pattern card, a card engaging arm at one end of the carriage, an adjustable stop on said arm and a weighted card presser carried by the opposite end of the carriage for pressing the card against the stop.

96. In a duplicating card punching device, a plurality of punches, means controlled by a pattern card for selectively and automatically actuating said punches and means for producing a field shifting of the pattern card and card being punched, thereby permitting original data to be punched in the card being operated upon.

97. In a duplicating punch, a plurality of punches, a pattern card mechanism controlled by the pattern card for selectively and automatically operating said punches and means actuated to produce the skipping of certain fields in the card being punched and in the pattern card, together with manually actuated means for moving the card being punched and the pattern card in either direction without affecting such punches.

98. In a duplicating punch, a plurality of punches, mechanism controlled by a pattern card for selectively and automatically actuating said punches, means for simultaneously and equally moving the pattern card and card being punched including a stepping dog and mechanism actuated to hold said dog in inactive position for predetermined periods whereby the pattern card and the card being punched may be moved over a given field.

99. In a duplicating punch, a plurality of punches, means for moving a pattern card and the card being punched step by step, electrically actuated mechanism controlled by the pattern card for automatically and selectively operating said punches including selector magnets and means for opening a gap in the selector magnet circuit, whereby the card moving means may be shifted in either direction without affecting the punches.

100. A card controlled switch for duplicating punches, comprising a cupped contact, a spring-actuated plunger and an interposed metallic member held in engagement with the contact by the plunger.

101. A card controlled switch for duplicating punches, comprising a cupped contact, a spring actuated plunger having a cupped end and a ball situated in the cups of the contact and plunger and forming electrical connection between the two.

102. In a card punching machine, a card hopper for containing cards to be punched and having means to prevent lateral movement of the cards therein and means for elevating the cards in the hopper to facilitate their removal.

103. In a card punching machine, a card hopper for containing record cards to be punched and means to raise a stack of cards from the hopper above the sides, so as to facilitate their removal.

104. In a card punching machine, a hopper for receiving a stack of cards and a pivoted lever at one end arranged to engage beneath the cards whereby, upon depression of the opposite end, the stack will be raised in the hopper to facilitate their removal.

105. In a punching machine, the combination with a typewriter, electrically operated punch selecting and punch operating mechanisms including selector magnets, circuit connections from the typewriter to said magnets controlled by the operation of certain of the keys of the typewriter, and means operating before the release of the actuated key to interrupt said circuit upon the operation of the punching mechanism.

106. In a punching machine, a typewriter, control means responsive to a pattern card, a punching attachment, and means for automatically controlling the operation of the punching attachment from the typewriter or the pattern card control means.

107. In a punching machine, a typewriter, control means responsive to a pattern card, a punching attachment, means for automatically controlling the operation of the punching attachment from the typewriter or the pattern card control means, and means for suppressing the effective control from the typewriter when the pattern card control is in operation.

108. In a punching machine, a typewriter, control means responsive to a pattern card, a punching attachment, means for automatically controlling the operation of the punching attachment from the typewriter or the pattern card control means, and means for suppressing the effective control from the pattern card when the punching mechanism is controlled from the typewriter.

109. In a punching machine, a typewriter, control means responsive to a pattern card, a punching attachment, means for controlling the operation of the punching attachment selectively from the typewriter or the pattern card control means, and means for suppressing the control from the typewriter or pattern card when either is in operation.

110. In a punching machine, a typewriter, punching mechanism, means whereby the punching mechanism may be controlled through the typewriter, control means for the punching mechanism responsive to a movable pattern card, and means for suppressing the pattern card control from various points in the movement of the pattern card.

111. In a punching machine, the combination with a typewriter, of punch operating mechanism, means actuated at the typewriter for controlling the punching mechanism, means controlled by a movable pattern card for actuating the punching mechanism, means controlled in the movement of the pattern card for alternatively suppressing and rendering active the control by the pattern card and typewriter.

112. In a punching machine, a typewriter, punching mechanism, mechanism controlled through the typewriter or a pattern card for actuating the punching mechanism, and means for suppressing the action of the punching mechanism from the typewriter irrespective of the pattern card control.

113. In a punching machine, a typewriter, punching mechanism, mechanism controlled through the typewriter or a pattern card for actuating the punching mechanism, and means for suppressing the action of the punching mechanism from the typewriter.

114. In a punching machine, a typewriter, punch selecting and punch actuating mechanisms, means controlled by a pattern card for actuating the selecting mechanism, means controlled by the typewriter for actuating the selecting mechanism, and means at the typewriter for suppressing the control from the pattern card to the selecting mechanism.

115. In combination a punching mechanism, means controlled by a pattern card for actuating the punching mechanism, and means for suppressing the control of the punching mechanism through the pattern card in selected zones of its movement.

116. In combination a punching mechanism, means for advancing a pattern card, mechanism controlled in the movement of the pattern card for actuating the punching mechanism, and means for holding the card in position which connects or interrupts the control of the pattern card of the punching mechanism.

117. In a punching machine, the combination with a typewriter, means for advancing a pattern card, punch selecting and punch actuating mechanisms, mechanism controlled at the typewriter for actuating the punching mechanism, mechanisms controlled in the movement of the pattern card for actuating the punching mechanism, and mechanism for rendering the punching mechanism controllable by the typewriter and suppressing the control through the pattern card.

118. In a typewriter punching apparatus in combination, a typewriter, a punching apparatus, means for controlling said punching apparatus in accordance with the depression of keys of the typewriter, and means having provisions for simultaneously spacing the typewriter and punch, said means also having provisions for permitting the spacing of the typewriter without the spacing of the punching apparatus.

119. In a typewriter controlled punch, in combination, spacing controlled mechanism comprising devices adapted to be operated in unison at the typewriter for spacing the typewriter and punch together, said devices having provisions for operating one of the same singly to permit the spacing of the typewriter and the exclusion of the punch spacing.

120. In a card punching machine, punching means, an electrical duplicator, a picker to advance a card to the punching means, a card carriage to receive the card from the picker and to carry such card through the punching means and for simultaneously moving a pattern card through the duplicator, means including a handle to advance said picker and restore said carriage to starting position, and a contact device in the duplicator circuit held closed by the handle when the latter is in its normal position but permitted to open when said handle is operated.

121. In a card punching machine, a set of punches, an electrical duplicator for controlling the selection of said punches, a picker to advance a card to the punches, a card feeding device to receive the card from the picker and to move it step-by-step past the punches, a device operable by said card feeding device to feed a pattern card through the duplicator simultaneously with the feeding of said card to said punches, means including a handle to advance said picker and restore the pattern card feeding device and the device for advancing a card to the punches to starting condition.

122. In a card punching machine, punches, a depresser for said punches, a magnet for actuating the depresser, an electrical duplicator for selecting said punches and energizing magnet, and means effective upon operation of the depresser to cut out the duplicator until the parts are restored to their normal position.

123. In a card punching machine, a line of punches, means including a depresser in the form of a pivoted bail for actuating any selected punch, a duplicator for controlling the selection of said punches, a contact device in the duplicator circuit, and an arm projecting from said bail to engage said contact device when the depresser is actuated and break the duplicator circuit at that point.

124. In a card punching device, an electrical duplicator for controlling the punching device, a carriage for simultaneously carrying a pattern card through the duplicator and a card through the punching mechanism, a movable handle on the carriage for returning the carriage to starting position and means operable by said handle in such return movement to render the duplicator ineffective.

125. In a card punching device, an electrical duplicator for controlling the punching device, a carriage for simultaneously carrying a pattern card through the duplicator and a card through the punching mechanism, a handle having a lug projecting therefrom and being mounted on said carriage for returning the same to starting position, a bail shiftable by said lug and operable thereby in any position of the carriage, and a contact device in the duplicator circuit operable through said bail to break said circuit.

126. In a card punching machine, a punching section, electro-magnetic means for operating said punching section, a duplicator for controlling such operating means, and means rendered effective by actuation of said operating means to cut out the duplicator and maintain this condition until the parts are restored to their normal positions.

In testimony whereof I hereto affix my signature.

JOHN T. SCHAAFF.